United States Patent
Shimura

(10) Patent No.: US 8,164,322 B2
(45) Date of Patent: Apr. 24, 2012

(54) PHASE-DIFFERENCE-CORRESPONDING-VALUE MEASUREMENT DEVICE, GAIN IMBALANCE MEASUREMENT DEVICE, METHOD, PROGRAM, AND RECORDING MEDIUM

(75) Inventor: Takashi Shimura, Tochigi (JP)

(73) Assignee: Advantest Corporation, Tokyo (JP)

( * ) Notice: Subject to any disclaimer, the term of this patent is extended or adjusted under 35 U.S.C. 154(b) by 419 days.

(21) Appl. No.: 12/544,316

(22) Filed: Aug. 20, 2009

(65) Prior Publication Data

US 2010/0134092 A1 Jun. 3, 2010

(30) Foreign Application Priority Data

Sep. 3, 2008 (JP) ................................ 2008-225474

(51) Int. Cl.
*G01R 25/00* (2006.01)
(52) U.S. Cl. .................................................. 324/76.78
(58) Field of Classification Search .................. None
See application file for complete search history.

(56) References Cited

U.S. PATENT DOCUMENTS

| | | | | |
|---|---|---|---|---|
| 7,045,996 | B2 * | 5/2006 | Lyon et al. ............... | 324/207.16 |
| 7,671,691 | B2 * | 3/2010 | Shiratsuchi et al. .......... | 332/103 |
| 2004/0150387 | A1 * | 8/2004 | Lyon et al. .................... | 324/127 |
| 2004/0250192 | A1 * | 12/2004 | Kanazawa .................... | 714/746 |
| 2007/0159621 | A1 | 7/2007 | Ukita | |
| 2008/0231850 | A1 | 9/2008 | Yamashita et al. | |
| 2008/0252644 | A1 | 10/2008 | Fujii | |
| 2009/0135891 | A1 | 5/2009 | Shimura | |
| 2009/0209218 | A1 * | 8/2009 | Shimura .................... | 455/226.1 |

FOREIGN PATENT DOCUMENTS

| | | |
|---|---|---|
| WO | 2007/072653 | 6/2007 |
| WO | 2007/077686 | 7/2007 |

\* cited by examiner

*Primary Examiner* — Jermele M Hollington
(74) *Attorney, Agent, or Firm* — Greenblum & Bernstein, P.L.C.

(57) ABSTRACT

A modulation error measurement device according to the present invention receives a demodulated signal containing a demodulated I signal and a demodulated Q signal from a quadrature demodulator receiving an RF signal output by a quadrature modulator and applying the quadrature demodulation to the received RF signal, and measures a quadrature error corresponding to a phase difference between an I component and a Q component of the modulated signal. The quadrature modulator applies quadrature modulation to an original I signal ($\omega_1$) and an original Q signal ($\omega_2$) having frequencies different from each other. The modulation error measurement device includes an I-frequency-phase deriving unit 14I which derives the phase of a component of an I frequency ($\omega_1$) of the demodulated signal, an opposite-sign I-frequency-phase deriving unit which derives the phase of a component of an opposite-sign I frequency ($-\omega_1$) of the demodulated signal, a Q-frequency-phase deriving unit which derives the phase of a component of a Q frequency ($\omega_2$) of the demodulated signal, and an opposite-sign Q-frequency-phase deriving unit which derives a phase of a component of an opposite-sign Q frequency ($-\omega_2$) of the demodulated signal.

10 Claims, 11 Drawing Sheets

Comparative Example

PHASE-DIFFERENCE-CORRESPONDING-VALUE MEASUREMENT DEVICE, GAIN IMBALANCE MEASUREMENT DEVICE, METHOD, PROGRAM, AND RECORDING MEDIUM

BACKGROUND ART

1. Field of the Invention

The present invention relates to measurement of errors of a quadrature modulator.

2. Description of the Prior Art

Conventionally, it has been known that errors of the quadrature modulator include a gain imbalance and a quadrature error.

Referring to abstracts of Patent Document 1 and Patent Document 2, there are descriptions that a phase difference of a signal modulated by a sub carrier is to be obtained. However, though these descriptions mention that the phase difference of the modulated signal is obtained, obtaining phase difference is different from obtaining a quadrature error of quadrature modulation (namely, difference between a phase difference between an I signal component and a Q signal component of a modulated signal and 90 degrees).

(Patent Document 1) WO 2007/072653 pamphlet
(Patent Document 2) WO 2007/077686 pamphlet

SUMMARY OF THE INVENTION

In view of the foregoing problems, an object of the present invention is to measure an error of a quadrature modulator.

According to the present invention, a phase-difference-corresponding-value measurement device which receives a demodulated signal from a quadrature demodulator for receiving a modulated signal output by a quadrature modulator, and applying quadrature demodulation to the received signal, and measures a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, includes: an I-frequency-phase deriving unit that derives the phase of a component of the I frequency of the demodulated signal; an opposite-sign I-frequency-phase deriving unit that derives the phase of a component of the opposite-sign I frequency of the demodulated signal; a Q-frequency-phase deriving unit that derives the phase of a component of the Q frequency of the demodulated signal; an opposite-sign Q-frequency-phase deriving unit that derives the phase of a component of the opposite-sign Q frequency of the demodulated signal; a first phase-difference-corresponding-value deriving unit that derives a first phase-difference corresponding value corresponding to a difference between the derived result of the I-frequency-phase deriving unit and the derived result of the Q-frequency-phase deriving unit; a second phase-difference-corresponding-value deriving unit that derives a second phase-difference corresponding value corresponding to a difference between the derived result of the opposite-sign I-frequency-phase deriving unit and the derived result of the opposite-sign Q-frequency-phase deriving unit; and an averaging unit that derives the phase-difference corresponding value based on an average of the first phase-difference corresponding value and the second phase-difference corresponding value.

The thus constructed phase-difference-corresponding-value measurement device receives a demodulated signal from a quadrature demodulator for receiving a modulated signal output by a quadrature modulator, and applying quadrature demodulation to the received signal, and measures a phase-difference corresponding value corresponding to a phase difference between an I component and a Q component of the modulated signal. The quadrature modulator applies the quadrature modulation to an original I signal and an original Q signal having frequencies different from each other. The frequency of the original I signal is referred to as I frequency, a frequency obtained by inverting the sign of the frequency of the original I signal is referred to as opposite-sign I frequency, the frequency of the original Q signal is referred to as Q frequency, and a frequency obtained by inverting the sign of the frequency of the original Q signal is referred to as opposite-sign Q frequency. An I-frequency-phase deriving unit derives the phase of a component of the I frequency of the demodulated signal. An opposite-sign I-frequency-phase deriving unit derives the phase of a component of the opposite-sign I frequency of the demodulated signal. A Q-frequency-phase deriving unit derives the phase of a component of the Q frequency of the demodulated signal. An opposite-sign Q-frequency-phase deriving unit derives the phase of a component of the opposite-sign Q frequency of the demodulated signal. A first phase-difference-corresponding-value deriving unit derives a first phase-difference corresponding value corresponding to a difference between the derived result of the I-frequency-phase deriving unit and the derived result of the Q-frequency-phase deriving unit. A second phase-difference-corresponding-value deriving unit derives a second phase-difference corresponding value corresponding to a difference between the derived result of the opposite-sign I-frequency-phase deriving unit and the derived result of the opposite-sign Q-frequency-phase deriving unit. An averaging unit derives the phase-difference corresponding value based on an average of the first phase-difference corresponding value and the second phase-difference corresponding value.

According to the phase-difference-corresponding-value measurement device of the present invention, the original I signal and the original Q signal may be fed to the quadrature modulator at a predetermined time point; and the original I signal having a frequency of the original Q signal at the predetermined time point, and the original Q signal having a frequency of the original I signal at the predetermined time point may be fed to the quadrature modulator after the predetermined time point.

According to the phase-difference-corresponding-value measurement device of the present invention, the first phase-difference corresponding value may be a difference between the difference between the derived result of the I-frequency-phase deriving unit and the derived result of the Q-frequency-phase deriving unit and 90 degrees; and the second phase-difference corresponding value may be a difference between the difference between the derived result of the opposite-sign I-frequency-phase deriving unit and the derived result of the opposite-sign Q-frequency-phase deriving unit and 90 degrees.

According to the phase-difference-corresponding-value measurement device of the present invention, the quadrature modulator may include: a local signal source for modulation that outputs a local signal for modulation, an I signal multiplier for modulation that multiplies the local signal for modulation and the original I signal by each other, a Q signal multiplier for modulation that multiplies an orthogonal local signal for modulation orthogonal in phase to the local signal for modulation and the original Q signal by each other, and an adder that adds an output from the I signal multiplier for modulation and an output from the Q signal multiplier for modulation to each other; and the quadrature demodulator may include: a local signal source for demodulation that outputs a local signal for demodulation, an I signal multiplier for demodulation that multiplies the local signal for demodulation and the modulated signal by each other, and a Q signal multiplier for demodulation that multiplies an orthogonal local signal for demodulation orthogonal in phase to the local signal for demodulation and the modulated signal by each other.

According to the present invention, a gain imbalance measurement device which receives a demodulated signal from a quadrature demodulator for receiving a modulated signal output by a quadrature modulator, and applying quadrature demodulation to the received signal, and measures a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, includes: an I-frequency-amplitude deriving unit that derives an amplitude of a component of the I frequency of the demodulated signal; an opposite-sign I-frequency-amplitude deriving unit that derives an amplitude of a component of the opposite-sign I frequency of the demodulated signal; a Q-frequency-amplitude deriving unit that derives an amplitude of a component of the Q frequency of the demodulated signal; an opposite-sign Q-frequency-amplitude deriving unit that derives an amplitude of a component of the opposite-sign Q frequency of the demodulated signal; a first amplitude ratio deriving unit that derives a ratio between the derived result of the I-frequency-amplitude deriving unit and the derived result of the Q-frequency-amplitude deriving unit for the respective frequencies; a second amplitude ratio deriving unit that derives a ratio between the derived result of the opposite-sign I-frequency-amplitude deriving unit and the derived result of the opposite-sign Q-frequency-amplitude deriving unit for the respective frequencies; and an averaging unit that derives the gain imbalance based on an average of the derived result of the first amplitude ratio deriving unit and the derived result of the second amplitude ratio deriving unit.

The thus constructed gain imbalance measurement device receives a demodulated signal from a quadrature demodulator for receiving a modulated signal output by a quadrature modulator, and applying quadrature demodulation to the received signal, and measures a gain imbalance which is a ratio between the amplitude of a I component of the modulated signal and the amplitude of an Q component. An original I signal and an original Q signal are fed to the quadrature modulator at a predetermined time point. The original I signal having a frequency of the original Q signal at the predetermined time point, and the original Q signal having a frequency of the original I signal at the predetermined time point are fed to the quadrature modulator after the predetermined time point. The quadrature modulator applies the quadrature modulation to the original I signal and the original Q signal having frequencies different from each other. The frequency of the original I signal is referred to as I frequency, a frequency obtained by inverting the sign of the frequency of the original I signal is referred to as opposite-sign I frequency, the frequency of the original Q signal is referred to as Q frequency, and a frequency obtained by inverting the sign of the frequency of the original Q signal is referred to as opposite-sign Q frequency. An I-frequency-amplitude deriving unit derives an amplitude of a component of the I frequency of the demodulated signal. An opposite-sign I-frequency-amplitude deriving unit derives an amplitude of a component of the opposite-sign I frequency of the demodulated signal. A Q-frequency-amplitude deriving unit derives an amplitude of a component of the Q frequency of the demodulated signal. An opposite-sign Q-frequency-amplitude deriving unit derives an amplitude of a component of the opposite-sign Q frequency of the demodulated signal. A first amplitude ratio deriving unit derives a ratio between the derived result of the I-frequency-amplitude deriving unit and the derived result of the Q-frequency-amplitude deriving unit for the respective frequencies. A second amplitude ratio deriving unit derives a ratio between the derived result of the opposite-sign I-frequency-amplitude deriving unit and the derived result of the opposite-sign Q-frequency-amplitude deriving unit for the respective frequencies. An averaging unit derives the gain imbalance based on an average of the derived result of the first amplitude ratio deriving unit and the derived result of the second amplitude ratio deriving unit.

According to the gain imbalance measurement device of the present invention, the quadrature modulator may include: a local signal source for modulation that outputs a local signal for modulation; an I signal multiplier for modulation that multiplies the local signal for modulation and the original I signal by each other; a Q signal multiplier for modulation that multiplies an orthogonal local signal for modulation orthogonal in phase to the local signal for modulation and the original Q signal by each other; and an adder that adds an output from the I signal multiplier for modulation and an output from the Q signal multiplier for modulation to each other, and the quadrature demodulator may include: a local signal source for demodulation that outputs a local signal for demodulation; an I signal multiplier for demodulation that multiplies the local signal for demodulation and the modulated signal by each other; and a Q signal multiplier for demodulation that multiplies an orthogonal local signal for demodulation orthogonal in phase to the local signal for demodulation and the modulated signal by each other.

According to the present invention, a phase-difference-corresponding-value measurement method of receiving a demodulated signal from a quadrature demodulator for receiving a modulated signal output by a quadrature modulator, and applying quadrature demodulation to the received signal, and measuring a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, includes: an I-frequency-phase deriving step that derives the phase of a component of the I frequency of the demodulated signal; an opposite-sign I-frequency-phase deriving step that derives the phase of a component of the opposite-sign I frequency of the demodulated signal; a Q-frequency-phase deriving step that derives the phase of a component of the Q frequency of the demodulated signal; an opposite-sign Q-frequency-phase deriving step that derives the phase of a component of the opposite-sign Q frequency of the demodulated signal; a first phase-difference-corresponding-value deriving step that derives a first phase-difference corresponding value corresponding to a difference between the derived result of the I-frequency-phase deriving step and the derived result of the Q-frequency-phase deriving step; a second phase-difference-corresponding-value deriving step that derives a second phase-difference corresponding value corresponding to a difference between the derived result of the opposite-sign I-frequency-phase deriving step and the derived result of the opposite-sign Q-frequency-phase deriving step; and an averaging step that derives the phase-difference corresponding value based on an average of the first phase-difference corresponding value and the second phase-difference corresponding value.

According to the present invention, a gain imbalance measurement method of receiving a demodulated signal from a quadrature demodulator for receiving a modulated signal output by a quadrature modulator, and applying quadrature demodulation to the received signal, and measuring a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, includes: an I-frequency-amplitude deriving step that derives an amplitude of a component of the I frequency of the demodulated signal; an opposite-sign I-frequency-amplitude deriving step that derives an amplitude of a component of the opposite-sign I frequency of the demodulated signal; a Q-frequency-amplitude deriving step that derives an amplitude of a component of the Q frequency of the demodulated signal; an opposite-sign Q-frequency-amplitude deriving step that derives an amplitude of a component of the opposite-sign Q frequency of the demodulated signal; a first amplitude ratio deriving step that derives a ratio between the derived result of the I-frequency-amplitude deriving step and the derived result of the Q-frequency-amplitude deriving step for the respective frequencies; a second amplitude ratio deriving step that derives a ratio between the derived result of the opposite-sign I-frequency-amplitude deriving step and the derived result of the opposite-sign Q-frequency-amplitude deriving step for the respective frequencies; and an averaging step that derives the gain imbalance based on an average of the derived result of the first amplitude ratio deriving step and the derived result of the second amplitude ratio deriving step.

The present invention is a program of instructions for execution by a computer to perform a phase-difference-corresponding-value measurement process of receiving a demodulated signal from a quadrature demodulator for receiving a modulated signal output by a quadrature modulator, and applying quadrature demodulation to the received signal, and measuring a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the phase-difference-corresponding-value measurement process including: an I-frequency-phase deriving step that derives the phase of a component of the I frequency of the demodulated signal; an opposite-sign I-frequency-phase deriving step that derives the phase of a component of the opposite-sign I frequency of the demodulated signal; a Q-frequency-phase deriving step that derives the phase of a component of the Q frequency of the demodulated signal; an opposite-sign Q-frequency-phase deriving step that derives the phase of a component of the opposite-sign Q frequency of the demodulated signal; a first phase-difference-corresponding-value deriving step that derives a first phase-difference corresponding value corresponding to a difference between the derived result of the I-frequency-phase deriving step and the derived result of the Q-frequency-phase deriving step; a second phase-difference-corresponding-value deriving step that derives a second phase-difference corresponding value corresponding to a difference between the derived result of the opposite-sign I-frequency-phase deriving step and the derived result of the opposite-sign Q-frequency-phase deriving step; and an averaging step that derives the phase-difference corresponding value based on an average of the first phase-difference corresponding value and the second phase-difference corresponding value.

The present invention is a program of instructions for execution by a computer to perform a gain imbalance measurement process of receiving a demodulated signal from a quadrature demodulator for receiving a modulated signal output by a quadrature modulator, and applying quadrature demodulation to the received signal, and measuring a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the gain imbalance measurement process including: an I-frequency-amplitude deriving step that derives an amplitude of a component of the I frequency of the demodulated signal; an opposite-sign I-frequency-amplitude deriving step that derives an amplitude of a component of the opposite-sign I frequency of the demodulated signal; a Q-frequency-amplitude deriving step that derives an amplitude of a component of the Q frequency of the demodulated signal; an opposite-sign Q-frequency-amplitude deriving step that derives an amplitude of a component of the opposite-sign Q frequency of the demodulated signal; a first amplitude ratio deriving step that derives a ratio between the derived result of the I-frequency-amplitude deriving step and the derived result of the Q-frequency-amplitude deriving step for the respective frequencies; a second amplitude ratio deriving step that derives a ratio between the derived result of the opposite-sign I-frequency-amplitude deriving step and the derived result of the opposite-sign Q-frequency-amplitude deriving step for the respective frequencies; and an averaging step that derives the gain imbalance based on an average of the derived result of the first amplitude ratio deriving step and the derived result of the second amplitude ratio deriving step.

The present invention is a computer-readable medium having a program of instructions for execution by a computer to perform a phase-difference-corresponding-value measurement process of receiving a demodulated signal from a quadrature demodulator for receiving a modulated signal output by a quadrature modulator, and applying quadrature demodulation to the received signal, and measuring a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the phase-difference-corresponding-value measurement process including: an I-frequency-phase deriving step that derives the phase of a component of the I frequency of the demodulated signal; an opposite-sign I-frequency-phase deriving step that derives the phase of a component of the opposite-sign I frequency of the demodulated signal; a Q-frequency-phase deriving step that derives the phase of a component of the Q frequency of the demodulated signal; an opposite-sign Q-frequency-phase deriving step that derives the phase of a component of the opposite-sign Q frequency of the demodulated signal; a first phase-difference-corresponding-value deriving step that derives a first phase-difference corresponding value corresponding to a difference between the derived result of the I-frequency-phase deriving step and the derived result of the Q-frequency-phase deriving step; a second phase-difference-corresponding-value deriving step that derives a second phase-difference corresponding value corresponding to a difference between the derived result of the opposite-sign I-frequency-phase deriving step and the derived result of the opposite-sign Q-frequency-phase deriving step; and an averaging step that derives the phase-difference corresponding value based on an average of the first phase-difference corresponding value and the second phase-difference corresponding value.

The present invention is a computer-readable medium having a program of instructions for execution by a computer to perform a gain imbalance measurement process of receiving a demodulated signal from a quadrature demodulator for receiving a modulated signal output by a quadrature modulator, and applying quadrature demodulation to the received signal, and measuring a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the gain imbalance measurement process including: an I-frequency-amplitude deriving step that derives an amplitude of a component of the I frequency of the demodulated signal; an opposite-sign I-frequency-amplitude deriving step that derives an amplitude of a component of the opposite-sign I frequency of the demodulated signal; a Q-frequency-amplitude deriving step that derives an amplitude of a component of the Q frequency of the demodulated signal; an opposite-sign Q-frequency-amplitude deriving step that derives an amplitude of a component of the opposite-sign Q frequency of the demodulated signal; a first amplitude ratio deriving step that derives a ratio between the derived result of the I-frequency-amplitude deriving step and the derived result of the Q-frequency-amplitude deriving step for the respective frequencies; a second amplitude ratio deriving step that derives a ratio between the derived result of the opposite-sign I-frequency-amplitude deriving step and the derived result of the opposite-sign Q-frequency-amplitude deriving step for the respective frequencies; and an averaging step that derives the gain imbalance based on an average of the derived result of the first amplitude ratio deriving step and the derived result of the second amplitude ratio deriving step.

BEST MODE FOR CARRYING OUT THE INVENTION

A description will now be given of embodiments of the present invention with reference to drawings.

First Embodiment

Figure 1:
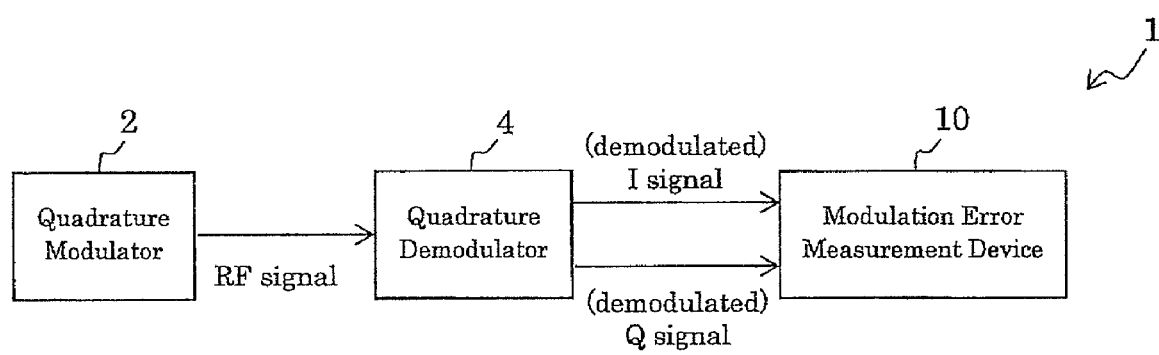
FIG. 1 is a functional block diagram showing a configuration of an error measurement system 1 according to a first embodiment of the present invention.

FIG. 1 is a functional block diagram showing a configuration of an error measurement system 1 according to a first embodiment of the present invention. The error measurement system 1 includes a quadrature modulator 2, a quadrature demodulator 4, and a modulation error measurement device (phase-difference-corresponding-value measurement device) 10.

The quadrature modulator 2 outputs a Radio Frequency (RF) signal (modulated signal). The quadrature demodulator 4 receives the RF signal, carries out quadrature demodulation, and outputs a (demodulated) I signal and a (demodulated) Q signal. The (demodulated) I signal and the (demodulated) Q signal construct the demodulated signal. An I component of the demodulated signal is a (demodulated) I signal and a Q component of the demodulated signal is a (demodulated) Q signal. The modulation error measurement device 10 receives the (demodulated) I signal and the (demodulated) Q signal from the quadrature demodulator 4, and measures a phase-difference corresponding value which corresponds to the phase difference between the I component and the Q component of the RF signal. Specifically, the modulation error measurement device 10 measures the phase difference between the I component and the Q component of the RF signal and 90 degrees (namely, the quadrature error of the quadrature modulator 2).

Figure 2:
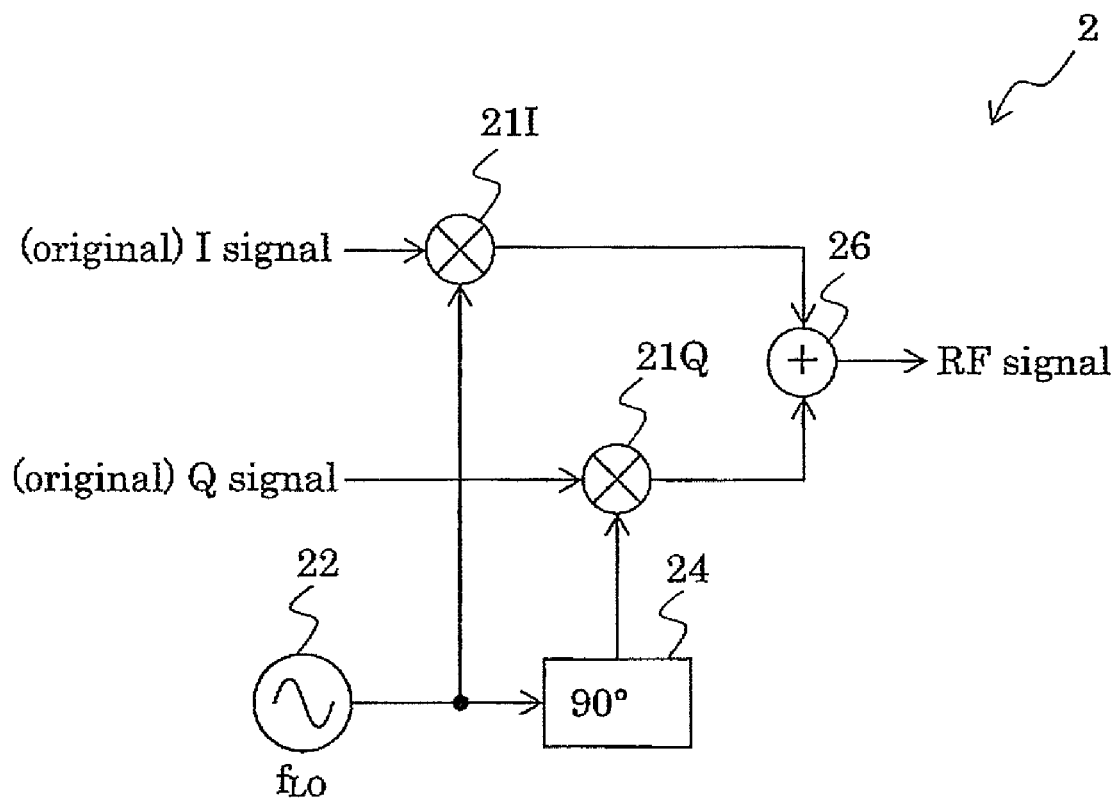
FIG. 2 is a functional block diagram showing a configuration of the quadrature modulator 2.

FIG. 2 is a functional block diagram showing a configuration of the quadrature modulator 2. The quadrature modulator 2 includes an I signal multiplier for modulation 21I, a Q signal multiplier for modulation 21Q, a local signal source for modulation 22, a phase shifter 24, and an adder 26. The quadrature modulator 2 applies the quadrature modulation to an (original) I signal and an (original) Q signal having frequencies different from each other.

Figure 3:
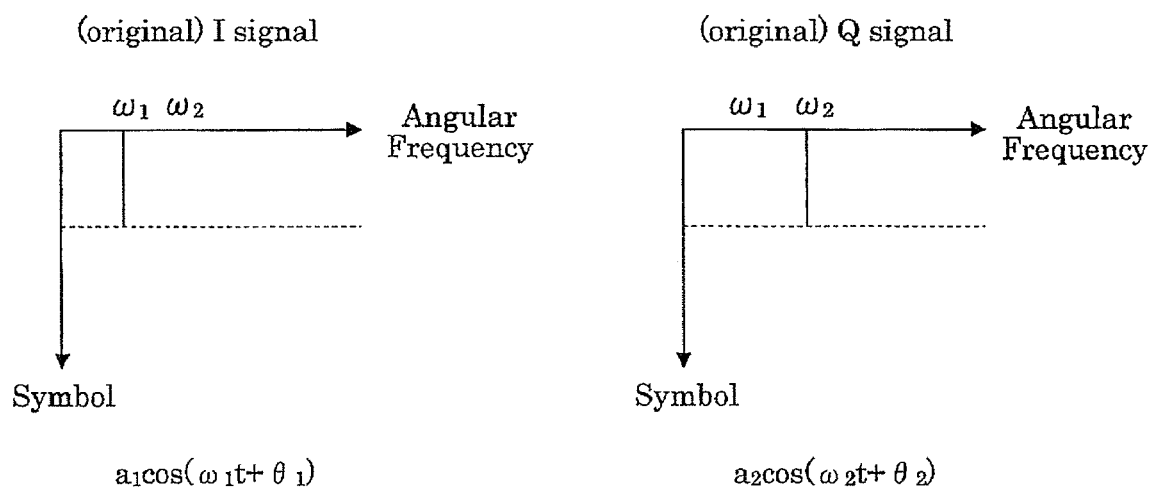
FIG. 3 shows frequency spectra of the (original) I signal and the (original) Q signal according to the first embodiment.

FIG. 3 shows frequency spectra of the (original) I signal and the (original) Q signal according to the first embodiment. The angular frequency of the (original) I signal is $\omega_1$, and the angular frequency of the (original) Q signal is $\omega_2$. Though a relationship $\omega_1 < \omega_2$ holds in FIG. 3, a relationship $\omega_1 > \omega_2$ may hold. The (original) I signal $S_I(t)$ and the (original) Q signal $S_Q(t)$ are represented by the following equations (1) and (2). It should be noted that t denotes time. $\theta_1$ and $\theta_2$ denote initial phases of $S_I(t)$ and $S_Q(t)$, respectively.

$$S_I(t) = a_1 \cos(\omega_1 t + \theta_1) \quad (1)$$

$$S_Q(t) = a_2 \cos(\omega_2 t + \theta_2) \quad (2)$$

It should be noted that the frequency spectra are shown while $a_1 = a_2$ in FIG. 3.

The local signal source for modulation 22 outputs a local signal for modulation (frequency: $f_{LO} = \omega_{LO}/(2\pi)$).

The I signal multiplier for modulation 21I multiplies the local signal for modulation and the (original) I signal. If the initial phase of the local signal for modulation is neglected, the output of the I signal multiplier for modulation 21I is represented by the following equation (3). It should be noted that $g_I$ is a gain provided by the I signal multiplier for modulation 21I.

$$S_I(t) g_I \sin(\omega_{LO} t) \quad (3)$$

The phase shifter 24 receives the local signal for modulation from the local signal source for modulation 22, changes the phase of the local signal for modulation by 90 degrees, and outputs the resulting signal. The signal orthogonal in phase to the local signal for modulation is referred to as orthogonal local signal for modulation. The phase shifter 24 outputs the orthogonal local signal for modulation.

The Q signal multiplier for modulation 21Q multiples the orthogonal local signal for modulation output by the phase shifter 24 and the (original) Q signal by each other. If the initial phase of the local signal for modulation and the quadrature error are neglected, the output of the Q signal multiplier for modulation 21Q is represented by the following equation (4). It should be noted that $g_Q$ is a gain provided by the Q signal multiplier for modulation 21Q.

$$S_Q(t) g_Q \cos(\omega_{LO} t) \quad (4)$$

The adder 26 adds the output from the I signal multiplier for modulation 21I and the output from the Q signal multiplier for modulation 21Q to each other. The output of the adder 26 is the RF signal (modulated signal). On this occasion, the output from the I signal multiplier for modulation 21I is referred to as I component of the modulated signal (refer to equation (3)). The output from the Q signal multiplier for modulation 21Q is referred to as Q component of the modulated signal (refer to equation (4)).

If the initial phase of the local signal for modulation and the quadrature error are neglected, the output of the adder 26 is represented by the following equation (5).

$$S_I(t) g_I \sin(\omega_{LO} t) + S_Q(t) g_Q \cos(\omega_{LO} t) \quad (5)$$

The difference between the phase of the I component of the RF signal and the phase of the Q component of the RF signal is ideally 90 degrees. However, the difference between the phase of the I component of the RF signal and the phase of the Q component of the RF signal takes a value different from 90 degrees due to variations in characteristics of the phase shifter 24 and the like.

On this occasion, as described before, the difference between the difference between the phase of the I component of the RF signal and the phase of the Q component of the RF signal and 90 degrees is the quadrature error.

Figure 4:
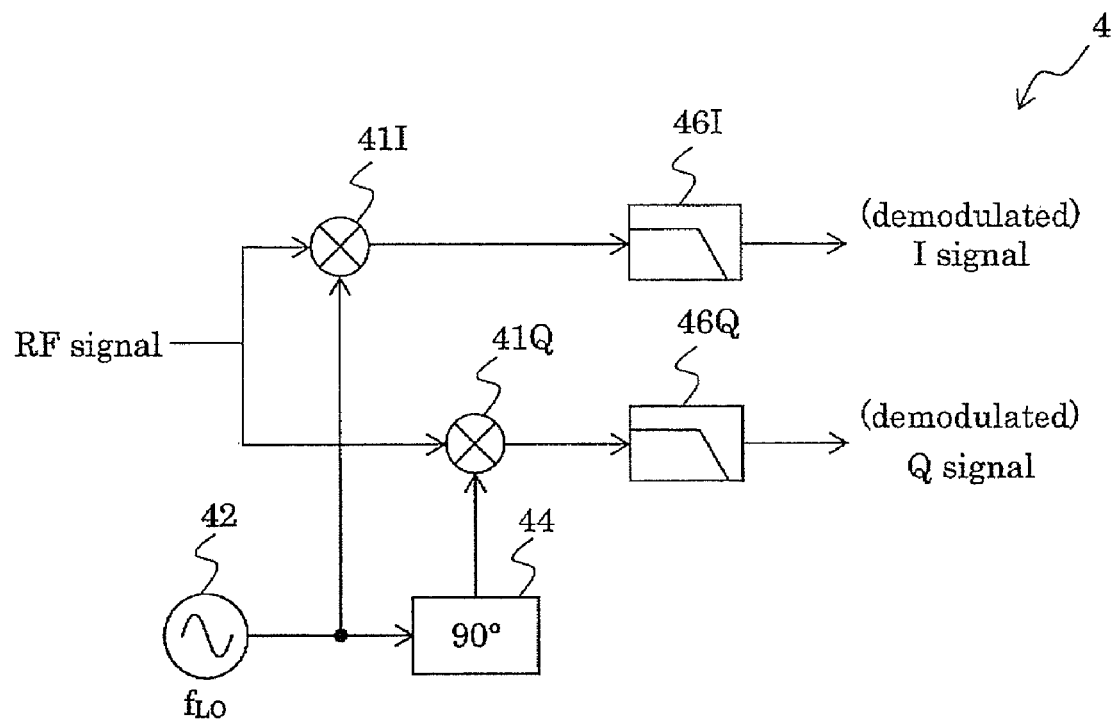
FIG. 4 is a functional block diagram showing a configuration of the quadrature demodulator 4.

FIG. 4 is a functional block diagram showing a configuration of the quadrature demodulator 4. The quadrature demodulator 4 includes an signal multiplier for demodulation 41I, a Q signal multiplier for demodulation 41Q, a local signal source for demodulation 42, a phase shifter 44, and low-pass filters 46I and 46Q. The quadrature demodulator 4 applies the quadrature demodulation to the RF signal (modulated signal).

The local signal source for demodulation 42 outputs a local signal for demodulation (frequency $f_{LO}$).

The I signal multiplier for demodulation 41I multiplies the local signal for demodulation and the RF signal. If the initial phase of the local signal for demodulation is neglected, the output of the I signal multiplier for demodulation 41I is represented by the following equation (6).

$$(S_I(t)g_I\sin(\omega_{LO}t)+S_Q(t)g_Q\cos(\omega_{LO}t))\sin(\omega_{LO}t)=(S_I(t)/2)g_I(1-\cos(2\omega_{LO}t))+(S_Q(t)/2)g_Q\sin(2\omega_{LO}t) \quad (6)$$

The phase shifter 44 receives the local signal for demodulation from the local signal source for demodulation 42, changes the phase of the local signal for demodulation by 90 degrees, and outputs the resulting signal. The signal orthogonal in phase to the local signal for demodulation is referred to as orthogonal local signal for demodulation. The phase shifter 44 outputs the orthogonal local signal for demodulation.

The Q signal multiplier for demodulation 41Q multiples the orthogonal local signal for demodulation output by the phase shifter 44 and the RF signal by each other. If the initial phase of the local signal for demodulation is neglected, the output of the Q signal multiplier for demodulation 41Q is represented by the following equation (7).

$$(S_I(t)g_I\sin(\omega_{LO}t)+S_Q(t)g_Q\cos(\omega_{LO}t))\cos(\omega_{LO}t)=(S_I(t)/2)g_I\sin(2\omega_{LO}t)+(S_Q(t)/2)g_Q(1+\cos(2\omega_{LO}t)) \quad (7)$$

The low-pass filter 46I passes a low-frequency component of an output from the I signal multiplier for demodulation 41I, thereby extracting a baseband component from the output of the I signal multiplier for demodulation 41I. The output from the low-pass filter 46I is the (demodulated) I signal. A component of the angular frequency $2\omega_{LO}$ of the (demodulated) I signal is cut, and the (demodulated) I signal is thus represented by the following equation (8).

(Demodulated) I signal: $(S_I(t)/2)g_I$ \quad (8)

The low-pass filter 46Q passes a low-frequency component of an output from the Q signal multiplier for demodulation 41Q, thereby extracting a baseband component from the output of the Q signal multiplier for demodulation 41Q. The output from the low-pass filter 46Q is the (demodulated) Q signal. A component of the angular frequency $2\omega_{LO}$ of the (demodulated) Q signal is cut, and the (demodulated) Q signal is thus represented by the following equation (9).

(Demodulated) Q signal: $(S_Q(t)/2)g_Q$ \quad (9)

Up to this point, the initial phase of the local signal for modulation, the quadrature error, and the initial phase of the local signal for demodulation have been neglected. However, they are not negligible. On this occasion, a sum of the initial phase of the local signal for modulation and the initial phase of the local signal for demodulation is denoted by $\theta_i$, and the quadrature error is denoted by $\theta_{err}$.

When the (original) I signal $S_I(t)$ is fed to the quadrature modulator 2, and the (original) Q signal $S_Q(t)$ is not fed to the quadrature modulator 2 ($S_Q(t)=0$), only the (demodulated) I signal (refer to the equation (8)) is ideally output from the quadrature demodulator 4 by nature.

However, $\theta_i$ and $\theta_{err}$ are not negligible, and (demodulated) I signal and the (demodulated) Q signal represented by the following equation (10) and (11) are output.

(Demodulated) I signal: $(S_I(t)/2)g_I\cos\theta_i$ \quad (10)

(Demodulated) Q signal: $(S_I(t)/2)g_I\sin\theta_i$ \quad (11)

When these (demodulated) I signal and (demodulated) Q signal are expressed using a complex number (hereinafter referred to as "(demodulated) IQ signal"), they are represented by the following equation (12).

(Demodulated) IQ signal: $(S_I(t)/2)g_I\exp(j\theta_i)$ \quad (12)

When the (original) I signal $S_I(t)$ is not fed to the quadrature modulator 2 ($S_I(t)=0$), and the (original) Q signal $S_Q(t)$ is fed to the quadrature modulator 2, only the (demodulated) Q signal (refer to the equation (9)) is ideally output from the quadrature demodulator 4 by nature.

However, $\theta_i$ and $\theta_{err}$ are not negligible, and (demodulated) I signal and the (demodulated) Q signal represented by the following equations (13) and (14) are output.

(Demodulated) I signal: $(S_Q(t)/2)g_Q\cos(\theta_i+\theta_{err}+\pi/2)$ \quad (13)

(Demodulated) Q signal: $(S_Q(t)/2)g_Q\sin(\theta_i+\theta_{err}+\pi/2)$ \quad (14)

When these (demodulated) I signal and (demodulated) Q signal are expressed using a complex number, they are represented by the following equation (15).

(Demodulated) IQ signal: $(S_Q(t)/2)g_Q\exp(j(\theta_i+\theta_{err}+\pi/2))$ \quad (15)

Thus, when the (original) I signal $S_I(t)$ and (original) Q signal $S_Q(t)$ are fed to the quadrature modulator 2, the (demodulated) IQ signal is, as represented by the following equation (16), a sum of the equation (12) and the equation (15).

(Demodulated) IQ signal: $(S_I(t)/2)g_I\exp(j\theta_i)+(S_Q(t)/2)g_Q\exp(j(\theta_i+\theta_{err}+\pi/2))$ \quad (16)

where $S_I(t)$ and $S_Q(t)$ are defined by the equations (1) and (2). They are deformed, and are represented by the following equations (17) and (18).

$$S_I(t)=a_1\cos(\omega_1 t+\theta_1)=(\tfrac{1}{2})a_1(\exp(j(\omega_1 t+\theta_1))+\exp(-j(\omega_1 t+\theta_1))) \quad (17)$$

$$S_Q(t)=a_2\cos(\omega_2 t+\theta_2)=(\tfrac{1}{2})a_2(\exp(j(\omega_2 t+\theta_2))+\exp(-j(\omega_2 t+\theta_2))) \quad (18)$$

Thus, by assigning the equations (17) and (18) to the equation (16), the (demodulated) IQ signal is represented by the following equation (19).

(Demodulated) IQ signal:

$$(1/4)a_1 g_I\exp(j(\omega_1 t+\theta_1+\theta_i))+(1/4)a_1 g_I\exp(-j(\omega_1 t+\theta_1-\theta_i))+ \quad (19)$$
$$(1/4)a_2 g_Q(\exp(j(\omega_2 t+\theta_2+\theta_i+\theta_{err}+\pi/2))+$$
$$(1/4)a_2 g_Q(\exp(-j(\omega_2 t+\theta_2-\theta_i-\theta_{err}-\pi/2))$$

In other words, the (demodulated) IQ signal includes:

a component of the frequency $\omega_1/(2\pi)$ (I frequency) of the (original) I signal, a component of the frequency $(-\omega_1/(2\pi))$ (opposite-sign I frequency) obtained by inverting the sign of the frequency $\omega_1/(2\pi)$ of the (original) I signal, a component of the frequency $\omega_2/(2\pi)$ (Q frequency) of the (original) Q signal, and a component of the frequency $(-\omega_2/(2\pi))$ (opposite-sign Q frequency) obtained by inverting the sign of the frequency $\omega_2/(2\pi)$ of the (original) Q signal.

Figure 5:
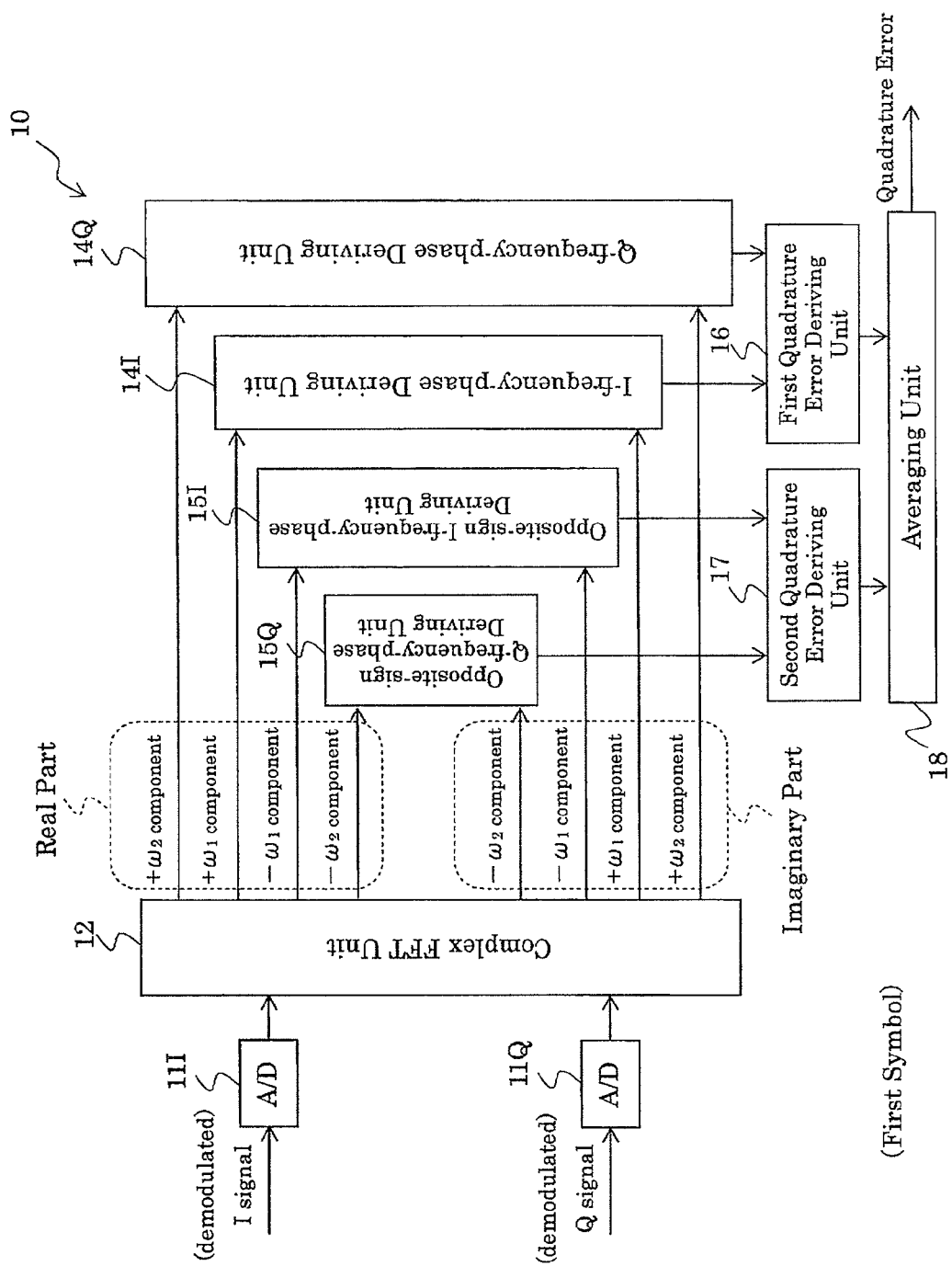
FIG. 5 is a functional block diagram showing the configuration of a modulation error measurement device (phase-difference-corresponding-value measurement device) 10 according to the first embodiment.

FIG. 5 is a functional block diagram showing the configuration of a modulation error measurement device (phasedifference-corresponding-value measurement device) 10 according to the first embodiment. The modulation error measurement device 10 includes A/D converters 11I and 11Q, a complex FFT unit 12, an I-frequency-phase deriving unit 14I, an opposite-sign I-frequency-phase deriving unit 15I, a Q-frequency-phase deriving unit 14Q, an opposite-sign Q-frequency-phase deriving unit 15Q, a first quadrature error deriving unit (first phase-difference-corresponding-value deriving unit) 16, a second quadrature error deriving unit (second phase-difference-corresponding-value deriving unit) 17, and an averaging unit 18.

The A/D converter 11I receives the (demodulated) I signal (analog signal) from the quadrature demodulator 4, converts the received signal into a digital signal, and outputs the digital signal.

The A/D converter 11Q receives the (demodulated) Q signal (analog signal) from the quadrature demodulator 4, converts the received signal into a digital signal, and outputs the digital signal.

The complex FFT unit 12 receives the (demodulated) I signal converted into the digital signal from the A/D converter 11I, and receives the (demodulated) Q signal converted into the digital signal from the A/D converter 11Q. Moreover, the complex FFT unit 12 applies the FFT to the demodulated signal constituted by the (demodulated) I signal as the real part and the (demodulated) Q signal as the imaginary part, and outputs the real part and the imaginary part of the I frequency component (angular frequency: $+\omega_1$) of the demodulated signal, the real part and the imaginary part of the opposite-sign I frequency component (angular frequency: $-\omega_1$) of the demodulated signal, the real part and the imaginary part of the Q frequency component (angular frequency: $+\omega_2$) of the demodulated signal, and the real part and the imaginary part of the opposite-sign Q frequency component (angular frequency: $-\omega_2$) of the demodulated signal.

The I-frequency-phase deriving unit 14I derives the phase of the I frequency component of the demodulated signal based on the real part and imaginary part of the I frequency component (angular frequency: $+\omega_1$) of the demodulated signal.

From the equation (19), it is appreciated that the I frequency component (angular frequency: $+\omega_1$) of the demodulated signal is:

$$(¼)a_1 g_I \exp(j(\omega_1 t+\theta_1+\theta_i)) \quad (20)$$

Thus, the phase of the I frequency component of the demodulated signal is $\theta_1+\theta_i$. On this occasion, the real part and imaginary part of the I frequency component (angular frequency: $+\omega_1$) of the demodulated signal are represented by the following equations (23) and (24).

Real part of the I frequency component of the demodulated signal:

$$(¼)a_1 g_I \cos(\theta_1+\theta_i) \quad (23)$$

Imaginary part of the I frequency component of the demodulated signal:

$$(¼)a_1 g_I \sin(\theta_1+\theta_i) \quad (24)$$

Thus, by calculating $\tan^{-1}$ ((imaginary part of I frequency component of demodulated signal, refer to equation (24))/(real part of I frequency component of demodulated signal, refer to equation (23))), the phase $\theta_1+\theta_i$ of the I frequency component (angular frequency: $+\omega_1$) of the demodulated signal can be obtained.

It should be noted that a phase noise $\theta_{\epsilon 1}$ is actually added, and the output of the I-frequency-phase deriving unit 14I is $\theta_1+\theta_i+\theta_{\epsilon 1}$.

It should be noted that the phase noise is a function of time. Thus, the phase noise is $\theta_{\epsilon 1}$ at any of the I-frequency-phase deriving unit 14I, the opposite-sign I-frequency-phase deriving unit 15I, the Q-frequency-phase deriving Unit 14Q, and the opposite-sign Q-frequency-phase deriving unit 15Q.

The opposite-sign I-frequency-phase deriving unit 15I derives the phase of the opposite-sign I frequency component of the demodulated signal based on the real part and imaginary part of the opposite-sign I frequency component (angular frequency: $-\omega_1$) of the demodulated signal.

From the equation (19), it is appreciated that the opposite-sign I frequency component (angular frequency: $-\omega_1$) of the demodulated signal is:

$$(¼)a_1 g_I \exp(-j(\omega_1 t+\theta_1-\theta_i)) \quad (25)$$

Thus, the phase of the opposite-sign I frequency component of the demodulated signal is $-\theta_1+\theta_i$. On this occasion, the real part and imaginary part of the opposite-sign I frequency component (angular frequency: $-\omega_1$) of the demodulated signal are represented by the following equations (28) and (29).

Real part of the opposite-sign I frequency component of the demodulated signal:

$$(¼)a_1 g_I \cos(-\theta_1+\theta_i) \quad (28)$$

Imaginary part of the opposite-sign I frequency component of the demodulated signal:

$$(¼)a_1 g_I \cos(-\theta_1+\theta_i) \quad (29)$$

Thus, by calculating $\tan^{-1}$ ((imaginary part of opposite-sign I frequency component of demodulated signal, refer to equation (29))/(real part of opposite-sign I frequency component of demodulated signal, refer to equation (28))), the phase $-\theta_1+\theta_i$ of the opposite-sign I frequency component (angular frequency: $-\omega_1$) of the demodulated signal can be obtained.

It should be noted that the phase noise $\theta_{\epsilon 1}$ is actually added, and the output of the opposite-sign I-frequency-phase deriving unit 15I is $-\theta_1+\theta_i+\theta_{\epsilon 1}$.

The Q-frequency-phase deriving unit 14Q derives the phase of the Q frequency component of the demodulated signal based on the real part and imaginary part of the Q frequency component (angular frequency: $+\omega_2$) of the demodulated signal.

From the equation (19), it is appreciated that the Q frequency component (angular frequency: $+\omega_2$) of the demodulated signal is:

$$(¼)a_2 g_Q (\exp(j(\omega_2 t+\theta_2+\theta_i+\theta_{err}+\pi/2)) \quad (30)$$

Thus, the phase of the Q frequency component of the demodulated signal is $\theta_2+\theta_i+\theta_{err}+\pi/2$. On this occasion, the real part and imaginary part of the Q frequency component (angular frequency: $+\omega_2$) of the demodulated signal are represented by the following equations (33) and (34).

Real part of the Q frequency component of the demodulated signal:

$$(¼)a_2 g_Q \cos(\theta_2+\theta_i+\theta_{err}+\pi/2) \quad (33)$$

Imaginary part of the Q frequency component of the demodulated signal:

$$(¼)a_2 g_Q \sin(\theta_2+\theta_i+\theta_{err}+\pi/2) \quad (34)$$

Thus, by calculating $\tan^{-1}$ ((imaginary part of Q frequency component of demodulated signal, refer to equation (34))/(real part of Q frequency component of demodulated signal, refer to equation (33))), the phase $\theta_2+\theta_i+\theta_{err}+\pi/2$ of the Q frequency component (angular frequency: $+\omega_2$) of the demodulated signal can be obtained.

It should be noted that the phase noise $\theta_{\epsilon 1}$ is actually added, and the output of the Q-frequency-phase deriving unit 14Q is $\theta_2+\theta_i+\theta_{err}+\pi/2+\theta_{\epsilon 1}$.

The opposite-sign Q-frequency-phase deriving unit 15Q derives the phase of the opposite-sign Q frequency component of the demodulated signal based on the real part and imaginary part of the opposite-sign Q frequency component (angular frequency: $-\omega_2$) of the demodulated signal.

From the equation (19), it is appreciated that the opposite-sign Q frequency component (angular frequency: $-\omega_2$) of the demodulated signal is:

$$(1/4)a_2 g_Q(\exp(-j(\omega_2 t+\theta_2-\theta_i-\theta_{err}-\pi/2))) \qquad (35)$$

Thus, the phase of the opposite-sign Q frequency component of the demodulated signal is $-\theta_2+\theta_i+\theta_{err}+\pi/2$. On this occasion, the real part and imaginary part of the opposite-sign Q frequency component (angular frequency: $-\omega_2$) of the demodulated signal are represented by the following equations (38) and (39).

Real part of the opposite-sign Q frequency component of the demodulated signal:

$$(1/4)a_2 g_Q \cos(-\theta_2+\theta_i+\theta_{err}+\pi/2) \qquad (38)$$

Imaginary part of the opposite-sign Q frequency component of the demodulated signal:

$$(1/4)a_2 g_Q \sin(-\theta_2+\theta_i+\theta_{err}+\pi/2) \qquad (39)$$

Thus, by calculating $\tan^{-1}$ ((imaginary part of opposite-sign Q frequency component of demodulated signal, refer to equation (39))/(real part of opposite-sign Q frequency component of demodulated signal, refer to equation (38))), the phase $-\theta_2+\theta_i+\theta_{err}+\pi/2$ of the opposite-sign Q frequency component (angular frequency: $-\omega_2$) of the demodulated signal can be obtained.

It should be noted that the phase noise $\theta_{\epsilon 1}$ is actually added, and the output of the opposite sign Q-frequency-phase deriving unit 15Q is $-\theta_2+\theta_i+\theta_{err}+\pi/2+\theta_{\epsilon 1}$.

The first quadrature error deriving unit (first phase-difference-corresponding-value deriving unit) 16 derives the first phase-difference corresponding value corresponding to the difference between the derived result ($\theta_1+\theta_i+\theta_{\epsilon 1}$) of the I-frequency-phase deriving unit 14I and the derived result ($\theta_2+\theta_i+\theta_{err}+\pi/2+\theta_{\epsilon 1}$) of the Q-frequency-phase deriving unit 14Q. The first quadrature error deriving unit 16 specifically derives the difference between the difference between the derived result of the I-frequency-phase deriving unit 14I and the derived result of the Q-frequency-phase deriving unit 14Q and 90 degrees ($=\pi/2$).

Thus, the first phase-difference corresponding value is represented by the following equation (40):

$$\pi/2-((\theta_2+\theta_i+\theta_{err}+\pi/2+\theta_{\epsilon 1})-(\theta_1+\theta_i+\theta_{\epsilon 1}))=\theta_1-\theta_2-\theta_{err} \qquad (40)$$

It should be noted that the phase noise $\theta_{\epsilon 1}$ is removed in the first phase-difference corresponding value.

The second quadrature error deriving unit (second phase-difference-corresponding-value deriving unit) 17 derives the second phase-difference corresponding value corresponding to the difference between the derived result ($-\theta_1+\theta_i+\theta_{\epsilon 1}$) of the opposite-sign I-frequency-phase deriving unit 15I and the derived result ($-\theta_2+\theta_i+\theta_{err}+\pi/2+\theta_{\epsilon 1}$) of the opposite-sign Q-frequency-phase deriving unit 15Q. The second quadrature error deriving unit 17 specifically derives the difference between the difference between the derived result of the opposite-sign I-frequency-phase deriving unit 15I and the derived result of the opposite-sign Q-frequency-phase deriving unit 15Q and 90 degrees ($=\pi/2$).

Thus, the second phase-difference corresponding value is represented by the following equation (41):

$$\pi/2-((-\theta_2+\theta_i+\theta_{err}+\pi/2+\theta_{\epsilon 1})-(-\theta_1+\theta_i+\theta_{\epsilon 1}))=-\theta_1-\theta_2 \theta_{err} \qquad (41)$$

It should be noted that the phase noise $\theta_{\epsilon 1}$ is removed in the second phase-difference corresponding value.

The averaging unit 18 derives the quadrature error $\theta_{err}$ based on an average of the first phase-difference corresponding value and the second phase-difference corresponding value.

By averaging the equations (40) and (41), $-\theta_{err}$ is derived, and, thus, the sign is inverted to derive and output the quadrature error $\theta_{err}$.

A description will now be given of an operation of the first embodiment.

First, the quadrature modulator 2 (refer to FIG. 2) applies the quadrature modulation to the (original) I signal and (original) Q signal (refer to FIG. 3), and outputs the RF signal (modulated signal). The RF signal is demodulated according to the quadrature demodulation by the quadrature demodulator 4. The demodulated signals (equations (16) and (19)) are output from the quadrature demodulator 4. The demodulated signals include the (demodulated) I signal and (demodulated) Q signal.

The modulation error measurement device 10 receives the (demodulated) I signal and (demodulated) Q signal. The (demodulated) I signal is fed to the complex FFT unit 12 via the A/D converter 11I. The (demodulated) Q signal is fed to the complex FFT unit 12 via the A/D converter 11Q.

The complex FFT unit 12 applies the FFT to the demodulated signals, and outputs the real parts and imaginary parts of the I frequency component (angular frequency: $+\omega_1$), the opposite-sign I frequency component (angular frequency: $-\omega_1$), the Q frequency component (angular frequency: $+\omega_2$), and the opposite-sign Q frequency component (angular frequency: $-\omega_2$).

The I-frequency-phase deriving unit 14I, as $\tan^{-1}$ ((imaginary part of I frequency component of demodulated signal, refer to equation (24))/(real part of I frequency component of demodulated signal, refer to equation (23))), derives the phase $\theta_1+\theta_i$ of the I frequency component of the demodulated signal. It should be noted that the phase noise $\theta_{\epsilon 1}$ is actually added, and the output of the I-frequency-phase deriving unit 14I is $\theta_1+\theta_i+\theta_{\epsilon 1}$.

The opposite-sign I-frequency-phase deriving unit 15I, as $\tan^{-1}$ ((imaginary part of opposite-sign I frequency component of demodulated signal, refer to equation (29))/(real part of opposite-sign I frequency component of demodulated signal, refer to equation (28))), derives the phase $-\theta_1+\theta_i$ of the opposite-sign I frequency component of the demodulated signal. It should be noted that the phase noise $\theta_{\epsilon 1}$ is actually added, and the output of the opposite-sign I-frequency-phase deriving unit 15I is $-\theta_1+\theta_i+\theta_{\epsilon 1}$.

The Q-frequency-phase deriving unit 14Q, as $\tan^{-1}$ ((imaginary part of Q frequency component of demodulated signal, refer to equation (34))/(real part of Q frequency component of demodulated signal, refer to equation (33))), derives the phase $\theta_2+\theta_i+\theta_{err}+\pi/2$ of the Q frequency component of the demodulated signal. It should be noted that the phase noise $\theta_{\epsilon 1}$ is actually added, and the output of the Q-frequency-phase deriving unit 14Q is $\theta_2+\theta_i+\theta_{err}+\pi/2+\theta_{\epsilon 1}$.

The opposite-sign Q-frequency-phase deriving unit 15Q, as $\tan^{-1}$ ((imaginary part of opposite-sign Q frequency component of demodulated signal, refer to equation (39))/(real part of opposite-sign Q frequency component of demodulated signal, refer to equation (38))), derives the phase $-\theta_2+\theta_i+$ $\theta_{err}+\pi/2$ of the opposite-sign Q frequency component of the demodulated signal. It should be noted that the phase noise $\theta_{\epsilon 1}$ is actually added, and the output of the opposite-sign Q-frequency-phase deriving unit 15Q is $-\theta_2+\theta_i+\theta_{err}+\pi/2+\theta_{\epsilon 1}$.

The first quadrature error deriving unit 16 derives the difference between the difference between the derived result $(\theta_1+\theta_i+\theta_{\epsilon 1})$ of the I-frequency-phase deriving unit 14I and the derived result $(\theta_2+\theta_i+\theta_{err}+\pi/2+\theta_{\epsilon 1})$ of the Q-frequency-phase deriving unit 14Q and 90 degrees $(=\pi/2)$ (refer to the equation (40)).

The second quadrature error deriving unit 17 derives the difference between the difference between the derived result $(-\theta_1+\theta_i+\theta_{\epsilon 1})$ of the opposite-sign I-frequency-phase deriving unit 15I and the derived result $(-\theta_2+\theta_i+\theta_{err}+\pi/2+\theta_{\epsilon 1})$ of the opposite-sign Q-frequency-phase deriving unit 15Q and 90 degrees $(=\pi/2)$ (refer to the equation (41)).

The averaging unit 18 derives the quadrature error $(\theta_{err})$ based on the average of the first phase-difference corresponding value (refer to the equation (40)) and the second phase-difference corresponding value (refer to the equation (41)).

According to the first embodiment, the quadrature error of the quadrature modulator 2 can be measured. Moreover, the influence of the phase noise $\theta_{\epsilon 1}$ can be restrained.

Second Embodiment

Figure 6:
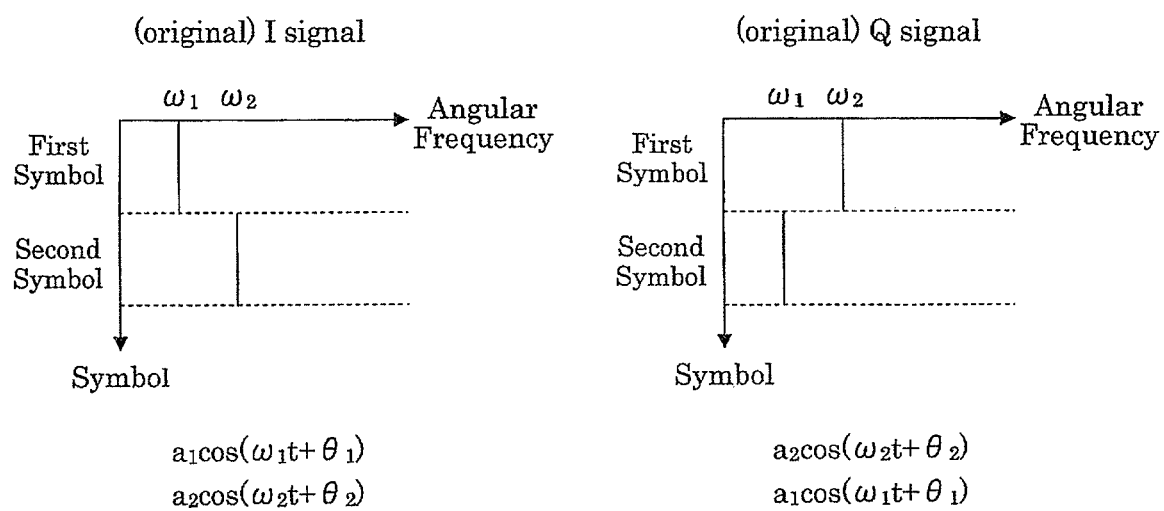
FIG. 6 shows frequency spectra of the (original) I signal and the (original) Q signal according to the second embodiment.

A second embodiment is the first embodiment where the (original) I signal and the (original) Q signal are changed according to time (refer to FIG. 6).

The error measurement system 1 according to the second embodiment of the present invention and the modulation error measurement device (phase-difference-corresponding-value measurement device) 10 according to the second embodiment are the same as those of the first embodiment, and hence a description thereof is therefore omitted.

FIG. 6 shows frequency spectra of the (original) I signal and the (original) Q signal according to the second embodiment. The frequency spectra of the (original) I signal and the (original) Q signal are obtained by adding a second symbol to the frequency spectra of the first embodiment (refer to FIG. 3).

The frequency spectra of the (original) I signal and (original) Q signal at a predetermined time point (first symbol) are the same as the frequency spectra of the first embodiment (refer to FIG. 3). In other words, the (original) I signal is $a_1 \cos(\omega_1 t+\theta_1)$, and the (original) Q signal is $a_2 \cos(\omega_2 t+\theta_2)$.

At a time point (second symbol) after the predetermined time point, the (original) I signal having the frequency $(\omega_2/(2\pi))$ of the (original) Q signal at the predetermined time point (first symbol) and the (original) Q signal having the frequency $(\omega_1/(2\pi))$ of the (original) I signal at the predetermined time point (first symbol) are fed to the quadrature modulator 2. The (original) I signal $S_I(t)$ and the (original) Q signal $S_Q(t)$ at the time point (second symbol) after the predetermined time point are represented as the following equations (42) and (43).

(Original) I signal: $a_2 \cos(\omega_2 t+\theta_2)$ (42)

(Original) Q signal: $a_1 \cos(\omega_1 t+\theta_1)$ (43)

A description will now be given of an operation of the second embodiment.

An operation of the second embodiment at the first symbol is the same as that of the first embodiment, and hence a description thereof is therefore omitted. It should be noted that the averaging unit 18 receives and stores the first phase-difference corresponding value (refer to equation (40)) and the second phase-difference corresponding value (refer to equation (41)).

Figure 7:
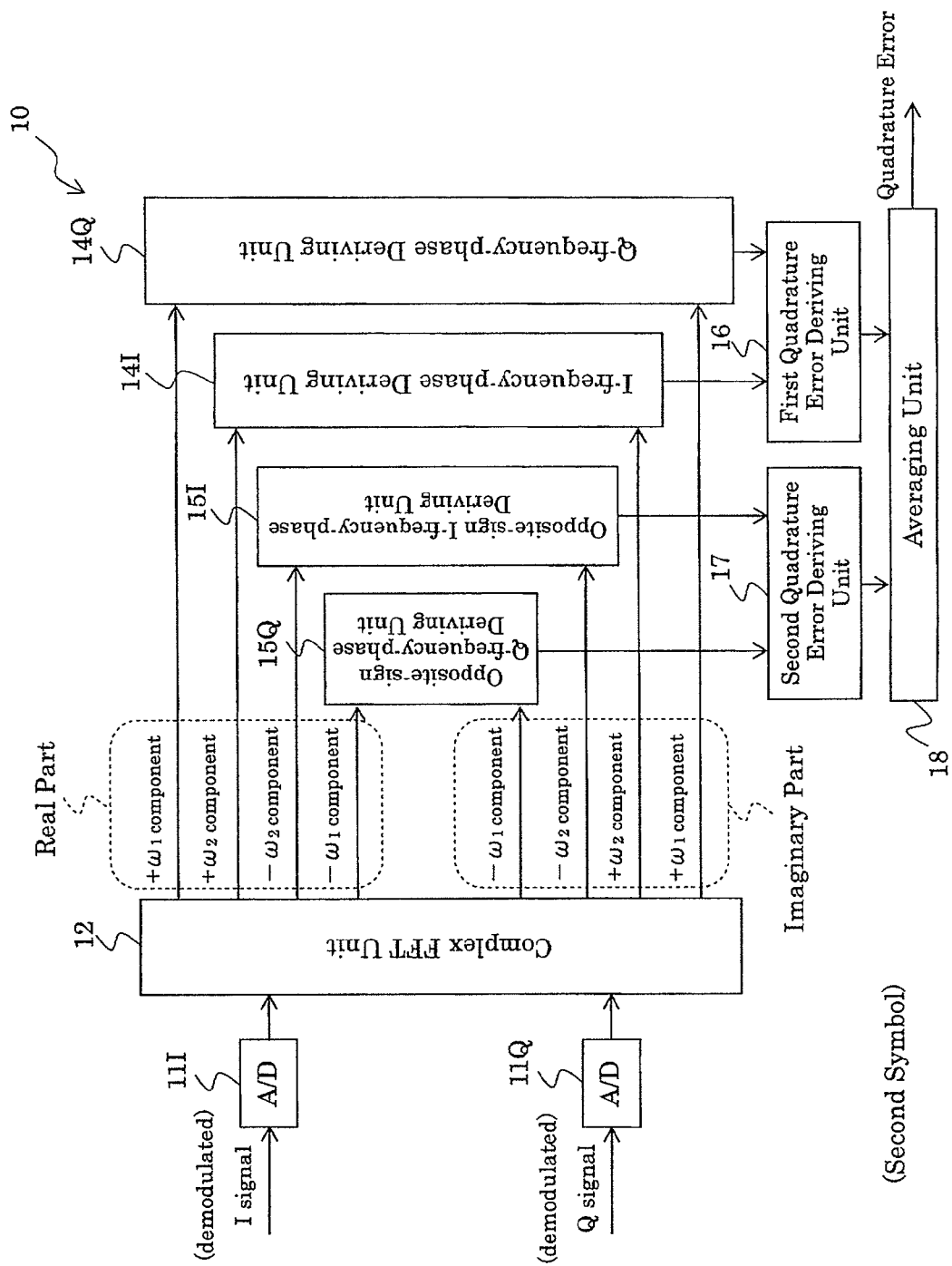
FIG. 7 describes the operation of the modulation error measurement device 10 according to the second embodiment at the second symbol.

A description will now be given of an operation of the second embodiment at the second symbol with reference to FIG. 7. FIG. 7 describes the operation of the modulation error measurement device 10 according to the second embodiment at the second symbol.

First, though the (demodulated) IQ signal is represented by the equation (16), $S_I(t)$ and $S_Q(t)$ are represented by the following equations (44) and (45).

$$S_I(t)=a_2\cos(\omega_2 t+\theta_2)=(1/2)a_2(\exp(j(\omega_2 t+\theta_2))+\exp(-j(\omega_2 t+\theta_2))) \quad (44)$$

$$S_Q(t)=a_1\cos(\omega_1 t+\theta_1)=(1/2)a_1(\exp(j(\omega_1 t+\theta_1))+\exp(-j(\omega_1 t+\theta_1))) \quad (45)$$

Thus, by assigning the equations (44) and (45) to the equation (16), the (demodulated) IQ signal is represented by the following equation (46).

(Demodulated) IQ signal (second symbol):

$$(1/4)a_2 g_I \exp(j(\omega_2 t+\theta_2+\theta_i)) + (1/4)a_2 g_I \exp(-j(\omega_2 t+\theta_2-\theta_i)) + \\ (1/4)a_1 g_Q(\exp(j(\omega_1 t+\theta_1+\theta_i+\theta_{err}+\pi/2)) + \\ (1/4)a_1 g_Q(\exp(-j(\omega_1 t+\theta_1-\theta_i-\theta_{err}-\pi/2)) \quad (46)$$

In other words, the (demodulated) IQ signal (second symbol) includes:

a component of the frequency $\omega_2$ (I frequency) of the (original) I signal, a component of the frequency $(-\omega_2)$ (opposite-sign I frequency) obtained by inverting the sign of the frequency $\omega_2$ of the (original) I signal, a component of the frequency $\omega_1$ (Q frequency) of the (original) Q signal, and a component of the frequency $(-\omega_1)$ (opposite-sign Q frequency) obtained by inverting the sign of the frequency $\omega_1$ of the (original) Q signal.

The operation of the modulation error measurement device (phase-difference-corresponding-value measurement device) 10 is the same as that of the first embodiment in terms of the A/D converters 11I and 11Q, and the complex FFT unit 12.

The I-frequency-phase deriving unit 14I derives the phase of the I frequency component of the demodulated signal based on the real part and imaginary part of the I frequency component (angular frequency: $+\omega_2$) of the demodulated signal.

From the equation (46), it is appreciated that the I frequency component (angular frequency: $+\omega_2$) of the demodulated signal is:

$$(1/4)a_2 g_I \exp(j((\omega_2 t+\theta_2+\theta_i))) \quad (47)$$

This corresponds to an equation obtained by replacing $a_1$, $\omega_1$ and $\theta_1$ of the equation (20) with $a_2$, $\omega_2$ and $\theta_2$. Thus, the operation of the I-frequency-phase deriving unit 14I at the second symbol corresponds to the operation of the I-frequency-phase deriving unit 14I according to the first embodiment where $a_1$, $\omega_1$ and $\theta_1$ are replaced with $a_2$, $\omega_2$ and $\theta_2$.

Thus, the real part and imaginary part of the I frequency component of the demodulated signal are represented by the following equations (48) and (49).

Real part of the I frequency component of the demodulated signal:

$$(1/4)a_2 g_I \cos(\theta_2 + \theta_i) \quad (48)$$

Imaginary part of the I frequency component of the demodulated signal:

$$(1/4)a_2 g_I \sin(\theta_2 + \theta_i) \quad (49)$$

Thus, by calculating $\tan^{-1}$ ((imaginary part of I frequency component of demodulated signal, refer to equation (49))/(real part of I frequency component of demodulated signal, refer to equation (48))), the phase $\theta_2 + \theta_i$ of the I frequency component (angular frequency: $+\omega_2$) of the demodulated signal can be obtained.

It should be noted that the phase noise $\theta_{\epsilon 2}$ is actually added, and the output of the I-frequency-phase deriving unit 14I is $\theta_2 + \theta_i + \theta_{\epsilon 2}$.

It should be noted that the phase noise is a function of time. Thus, the phase noise is $\theta_{\epsilon 2}$ at any of the I-frequency-phase deriving unit 14I, the opposite-sign I-frequency-phase deriving unit 15I, the Q-frequency-phase deriving unit 14Q, and the opposite-sign Q-frequency-phase deriving unit 15Q.

The opposite-sign I-frequency-phase deriving unit 15I derives the phase of the opposite-sign I frequency component of the demodulated signal based on the real part and imaginary part of the opposite-sign I frequency component (angular frequency: $-\omega_2$) of the demodulated signal.

From the equation (46), it is appreciated that the opposite-sign I frequency component (angular frequency: $+\omega_2$) of the demodulated signal is:

$$(1/4)a_2 g_I \exp(-j(\omega_2 t + \theta_2 - \theta_i)) \quad (50)$$

This corresponds to an equation obtained by replacing $a_1$, $\omega_1$ and $\theta_1$ of the equation (25) with $a_2$, $\omega_2$ and $\theta_2$. Thus, the operation of the opposite-sign I-frequency-phase deriving unit 15I at the second symbol corresponds to the operation of the opposite-sign I-frequency-phase deriving unit 15I according to the first embodiment where $a_1$, $\omega_1$ and $\omega_1$ are replaced with $a_2$, $\omega_2$ and $\theta_2$.

Thus, the real part and imaginary part of the opposite-sign I frequency component of the demodulated signal are represented by the following equations (51) and (52).

Real part of the opposite-sign I frequency component of the demodulated signal:

$$(1/4)a_2 g_I \cos(-\theta_2 + \theta_i) \quad (51)$$

Imaginary part of the opposite-sign I frequency component of the demodulated signal:

$$(1/4)a_2 g_I \sin(-\theta_2 + \theta_i) \quad (52)$$

Thus, by calculating $\tan^{-1}$ ((imaginary part of opposite-sign I frequency component of demodulated signal, refer to equation (52))/(real part of opposite-sign I frequency component of demodulated signal, refer to equation (51))), the phase $-\theta_2 + \theta_i$ of the opposite-sign I frequency component (angular frequency: $-\omega_2$) of the demodulated signal can be obtained.

It should be noted that the phase noise $\theta_{\epsilon 2}$ is actually added, and the output of the opposite-sign I-frequency-phase deriving unit 15I is $-\theta_2 + \theta_i + \theta_{\epsilon 2}$.

The Q-frequency-phase deriving unit 14Q derives the phase of the Q frequency component of the demodulated signal based on the real part and imaginary part of the Q frequency component (angular frequency: $+\omega_1$) of the demodulated signal.

From the equation (46), it is appreciated that the Q frequency component (angular frequency: $+\omega_1$) of the demodulated signal is:

$$(1/4)a_1 g_Q (\exp(j(\omega_1 t + \theta_1 + \theta_i + \theta_{err} + \pi/2)) \quad (53)$$

This corresponds to an equation obtained by replacing $a_2$, $\omega_2$ and $\theta_2$ of the equation (30) with $a_1$, $\omega_1$ and $\theta_1$. Thus, the operation of the Q-frequency-phase deriving unit 14Q at the second symbol corresponds to the operation of the Q-frequency-phase deriving unit 14Q according to the first embodiment where $a_2$, $\omega_2$ and $\theta_2$ are replaced with $a_1$, $\omega_1$ and $\theta_1$.

Thus, the real part and imaginary part of the Q frequency component of the demodulated signal are represented by the following equations (54) and (55).

Real part of the Q frequency component of the demodulated signal:

$$(1/4)a_1 g_Q \cos(\theta_1 + \theta_i + \theta_{err} + \pi/2)) \quad (54)$$

Imaginary part of the Q frequency component of the demodulated signal:

$$(1/4)a_1 g_Q \sin(\theta_1 + \theta_i + \theta_{err} + \pi/2) \quad (55)$$

Thus, by calculating $\tan^{-1}$ ((imaginary part of Q frequency component of demodulated signal, refer to equation (55))/(real part of Q frequency component of demodulated signal, refer to equation (54))), the phase $\theta_1 + \theta_i + \theta_{err} + \pi/2$ of the Q frequency component (angular frequency: $+\omega_1$) of the demodulated signal can be obtained.

It should be noted that the phase noise $\theta_{\epsilon 2}$ is actually added, and the output of the Q-frequency-phase deriving unit 14Q is $\theta_1 + \theta_i + \theta_{err} + \pi/2 + \theta_{\epsilon 2}$.

The opposite-sign Q-frequency-phase deriving unit 15Q derives the phase of the opposite-sign Q frequency component of the demodulated signal based on the real part and imaginary part of the opposite-sign Q frequency component (angular frequency: $-\omega_1$) of the demodulated signal.

From the equation (46), it is appreciated that the opposite-sign Q frequency component (angular frequency: $-\omega_1$) of the demodulated signal is:

$$(1/4)a_1 g_Q (\exp(-j(\omega_1 t + \theta_1 - \theta_i - \theta_{err} - \pi/2)) \quad (56)$$

This corresponds to an equation obtained by replacing $a_2$, $\omega_2$ and $\theta_2$ of the equation (35) with $a_1$, $\omega_1$ and $\theta_1$. Thus, the operation of the opposite-sign Q-frequency-phase deriving unit 15Q at the second symbol corresponds to the operation of the opposite-sign Q-frequency-phase deriving unit 15Q according to the first embodiment where $a_2$, $\omega_2$ and $\theta_2$ are replaced with $a_1$, $\omega_1$ and $\theta_1$.

Thus, the real part and imaginary part of the opposite-sign Q frequency component of the demodulated signal are represented by the following equations (57) and (58).

Real part of the opposite-sign Q frequency component of the demodulated signal:

$$(1/4)a_1 g_Q \cos(-\theta_1 + \theta_i - \theta_{err} - \pi/2) \quad (57)$$

Imaginary part of the opposite-sign Q frequency component of the demodulated signal:

$$(1/4)a_1 g_Q \sin(-\theta_1 + \theta_i \theta_{err} + \pi/2) \quad (58)$$

Thus, by calculating $\tan^{-1}$ ((imaginary part of opposite-sign Q frequency component of demodulated signal, refer to equation (58))/(real part of opposite-sign Q frequency component of demodulated signal, refer to equation (57))), the phase $-\theta_1 + \theta_i + \theta_{err} + \pi/2$ of the opposite-sign Q frequency component (angular frequency: $-\omega_1$) of the demodulated signal can be obtained.

It should be noted that the phase noise $\theta_{\epsilon 2}$ is actually added, and the output of the opposite-sign Q-frequency-phase deriving unit 15Q is $-\theta_1+\theta_i+\theta_{err}+\pi/2+\theta_{\epsilon 2}$.

The first quadrature error deriving unit 16 derives the difference (first phase-difference corresponding value) between the difference between the derived result $(\theta_2+\theta_i+\theta_{\epsilon 2})$ of the I-frequency-phase deriving unit 14I and the derived result $(\theta_1+\theta_i+\theta_{err}+\pi/2+\theta_{\epsilon 2})$ of the Q-frequency-phase deriving unit 14Q and 90 degrees ($=\pi/2$).

The first phase-difference corresponding value is represented by the following equation (59):

$$\pi/2-((\theta_1+\theta_i+\theta_{err}+\pi/2+\theta_{\epsilon 2})-(\theta_2+\theta_i+\theta_{\epsilon 2}))=\theta_2-\theta_1-\theta_{err} \quad (59)$$

The second quadrature error deriving unit 17 derives the difference (second phase-difference corresponding value) between the difference between the derived result $(-\theta_2+\theta_i+\theta_{\epsilon 2})$ of the opposite-sign I-frequency-phase deriving unit 15I and the derived result $(-\theta_1+\theta_i+\theta_{err}+\pi/2+\theta_{\epsilon 2})$ of the opposite-sign Q-frequency-phase deriving unit 15Q and 90 degrees ($=\pi/2$).

The second phase-difference corresponding value is represented by the following equation (60):

$$\pi/2-((-\theta_1+\theta_i+\theta_{err}+\pi/2+\theta_{\epsilon 2})-(-\theta_2+\theta_i+\theta_{\epsilon 2}))=-\theta_2+\theta_1-\theta_{err} \quad (60)$$

The averaging unit 18 derives the quadrature error ($\theta_{err}$) based on the average of the first phase-difference corresponding value at the first symbol (refer to the equation (40)), the first phase-difference corresponding value at the second symbol (refer to the equation (59)), the second phase-difference corresponding value at the first symbol (refer to the equation (41)), and the second phase-difference corresponding value at the second symbol (refer to the equation (60)). Specifically, the derived average is $-\theta_{err}$, and the sign is inverted to derive the quadrature error $\theta_{err}$.

According to the second embodiment, the quadrature error of the quadrature modulator 2 can be measured. Moreover, the influence of the phase noise can be restrained.

It should be noted that, compared with a case in which the angular frequencies of the (original) I signal are $\omega_1$ and $\omega_2$ at the first symbol while the (original) Q signal is not fed, and the angular frequencies of the (original) Q signal are $\omega_1$ and $\omega_2$ at the second symbol while the (original) I signal is not fed, the effect of restraining the influence of the phase noise according to the second embodiment will appear more clearly.

Figure 10:
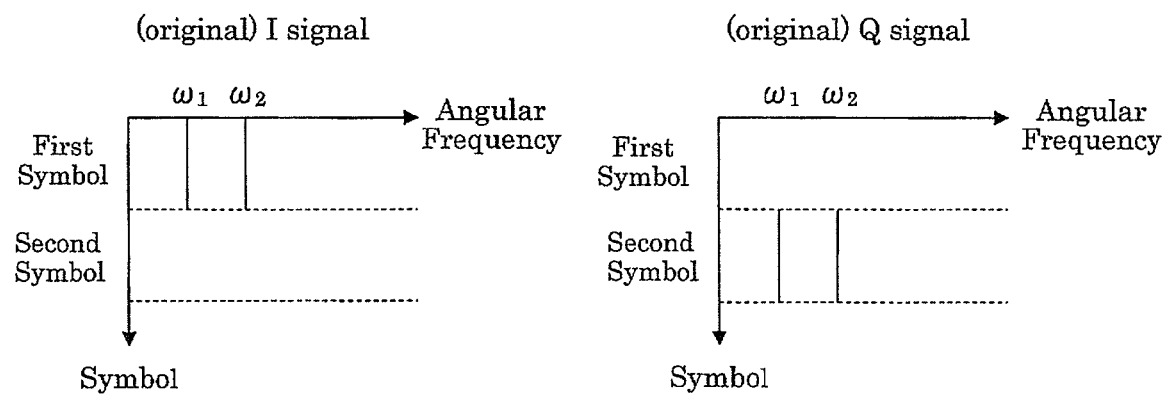
FIG. 10 shows frequency spectra of the (original) I signal and (original) Q signal in the case, which is an example of comparison with the second embodiment, and in which the angular frequencies of the (original) I signal are $\omega_1$ and $\omega_2$ for the first symbol while the (original) Q signal is not fed, and the angular frequencies of the (original) Q signal are $\omega_1$ and $\omega_2$ for the second symbol while the (original) I signal is not fed.

FIG. 10 shows frequency spectra of the (original) I signal and (original) Q signal in the case, which is an example of comparison with the second embodiment, and in which the angular frequencies of the (original) I signal are $\omega_1$ and $\omega_2$ for the first symbol while the (original) Q signal is not fed, and the angular frequencies of the (original) Q signal are $\omega_1$ and $\omega_2$ for the second symbol while the (original) I signal is not fed.

When the frequency spectra shown in FIG. 10 are fed to the quadrature modulator 2, $\theta_1+\theta_i+\theta_{\epsilon 1}$ (component of angular frequency $\omega_1$) and $\theta_2+\theta_i+\theta_{\epsilon 1}$ (component of angular frequency $\omega_2$) are output at the first symbol from the I-frequency-phase deriving unit 14I, which is the same as the first embodiment and the second embodiment. However, the (original) I signal is fed at the first symbol, and the phase noise is thus $\theta_{\epsilon 1}$.

When the frequency spectra shown in FIG. 10 are fed to the quadrature modulator 2, $\theta_1+\theta_i+\theta_{err}+\pi/2+\theta_{\epsilon 2}$ (component of angular frequency $\omega_1$) and $\theta_2+\theta_i+\theta_{err}+\pi/2+\theta_{\epsilon 2}$ a (component of angular frequency $\omega_2$) are output at the second symbol from the Q-frequency-phase deriving unit 14Q, which is the same as the first embodiment and the second embodiment. However, the (original) Q signal is fed at the second symbol, the phase noise is thus $\theta_{\epsilon 2}$.

On this occasion, focusing on the components of the angular frequency $\omega_1$, the first quadrature error deriving unit 16 derives the difference (first phase-difference corresponding value) between the difference between the derived result $(\theta_1+\theta_i+\theta_{\epsilon 1})$ of the I-frequency-phase deriving unit 14I and the derived result $(\theta_1+\theta_i+\theta_{err}+\pi/2+\theta_{\epsilon 2})$ of the Q-frequency-phase deriving unit 14Q and 90 degrees ($=\pi/2$). Then, the first phase-difference corresponding value is represented by the following equation (61):

$$\pi/2-((\theta_1+\theta_i+\theta_{err}+\pi/2+\theta_{\epsilon 2})-(\theta_1+\theta_i+\theta_{\epsilon 1}))=\theta_{err}+\theta_{\epsilon 1}-\theta_{\epsilon 2} \quad (61)$$

It should be noted that a difference in the phase noise $\theta_{\epsilon 1}-\theta_{\epsilon 2}$ is contained in the first phase-difference corresponding value. Since the quadrature error $\theta_{err}$ is derived based on the first phase-difference corresponding value, the derived quadrature error $\theta_{err}$ contains the error due to the difference in the phase noise.

Thus, the frequency spectra of the (original) I signal and (original) Q signal according to the second embodiment (refer to FIG. 6) is better in the restraint of the influence of the phase noise than the comparative example shown in FIG. 10.

It should be noted that the description is given of the case in which the number of types of the frequencies of the (original) I signal and (original) Q signal is one for any symbol (refer to FIG. 6) according to the second embodiment. However, for any symbol, two or more types of the frequencies of the (original) I signal and (original) Q signal may be used.

Figure 11:
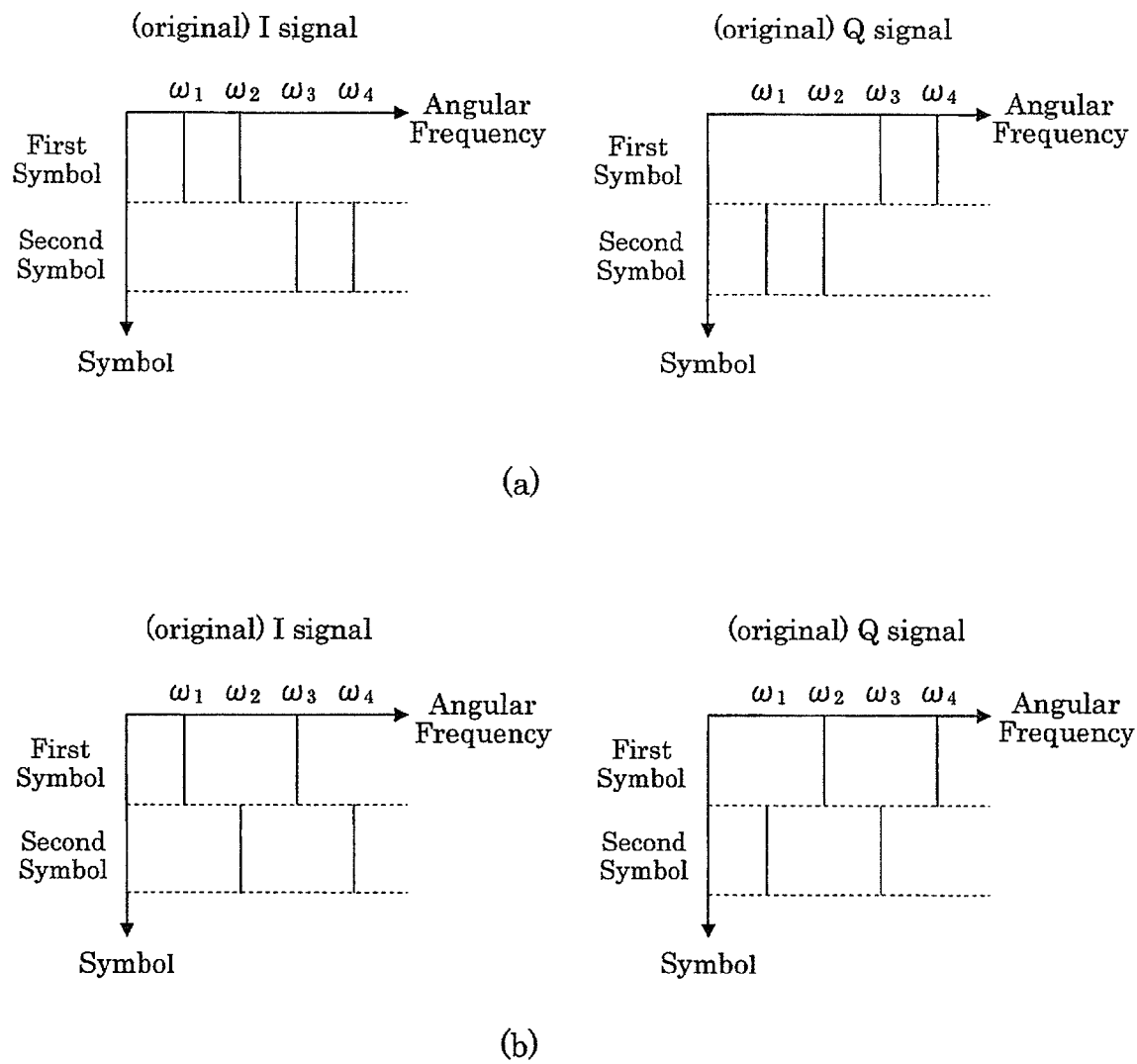
FIG. 11 shows an example (a modification of the second embodiment) in which the number of types of frequencies of the (original) I signal and the (original) Q signal are two.

FIG. 11 shows an example (a modification of the second embodiment) in which the number of types of frequencies of the (original) I signal and the (original) Q signal are two. It should be noted that the angular frequencies are set such that $\omega_1<\omega_2<\omega_3<\omega_4$.

According to FIG. 11(a), the (original) I signal (angular frequencies $\omega_1$, $\omega_2$) and the (original) Q signal (angular frequencies $\omega_3$, $\omega_4$) are fed to the quadrature modulator 2 (at a predetermined time point (first symbol). Further, the (original) I signal (angular frequencies $\omega_3$, $\omega_4$) having the frequencies of the (original) Q signal at the first symbol and the (original) Q signal (angular frequencies $\omega_1$, $\omega_2$) having the frequencies of the (original) I signal at the first symbol are fed to the quadrature modulator 2 at a time point (second symbol) after the predetermined time point.

According to FIG. 11(b), the (original) I signal (angular frequencies $\omega_1$, $\omega_3$) and the (original) Q signal (angular frequencies $\omega_2$, $\omega_4$) are fed to the quadrature modulator 2 at a predetermined time point (first symbol). Further, the (original) I signal (angular frequencies $\omega_2$, $\omega_4$) having the frequencies of the (original) Q signal at the first symbol and the (original) Q signal (angular frequencies $\omega_1$, $\omega_3$) having the frequencies of the (original) I signal at the first symbol are fed to the quadrature modulator 2 at a time point (second symbol) after the predetermined time point.

Third Embodiment

A third embodiment measures the gain imbalance of the quadrature modulator 2. It should be noted that the (original) I signal and (original) Q signal are the same as those of the second embodiment (refer to FIG. 6).

A configuration of the error measurement system 1 according to the third embodiment of the present invention is the same as that of the first embodiment. It should be noted that the modulation error measurement device (gain imbalance measurement device) 10 measures a ratio between the amplitude of the I component of the RF signal and the amplitude of the Q component of the RF signal.

Figure 8:
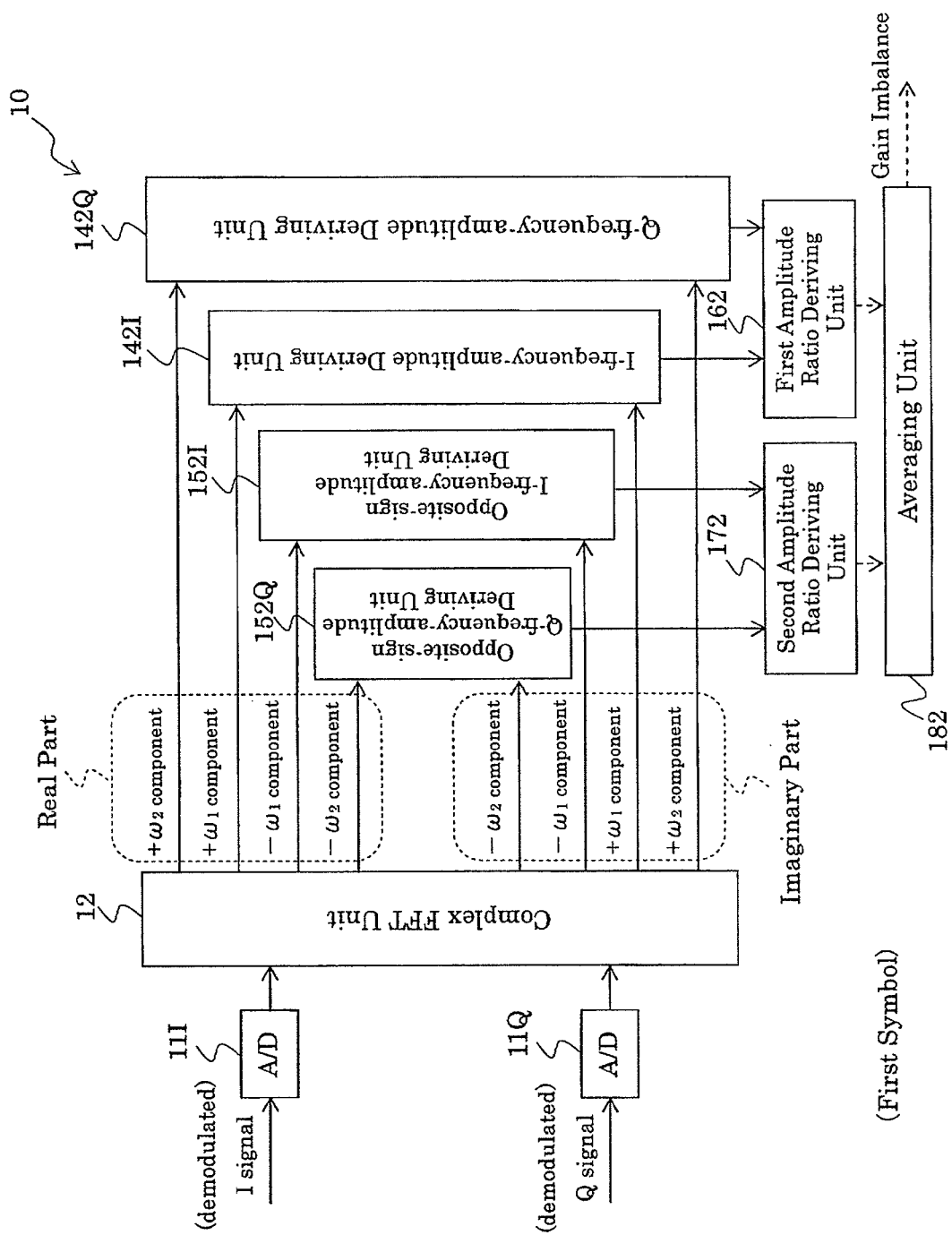
FIG. 8 is a functional block diagram showing a configuration of the modulation error measurement device (gain imbalance measurement device) 10 according to the third embodiment, and shows an operation at the first symbol.
Figure 9:
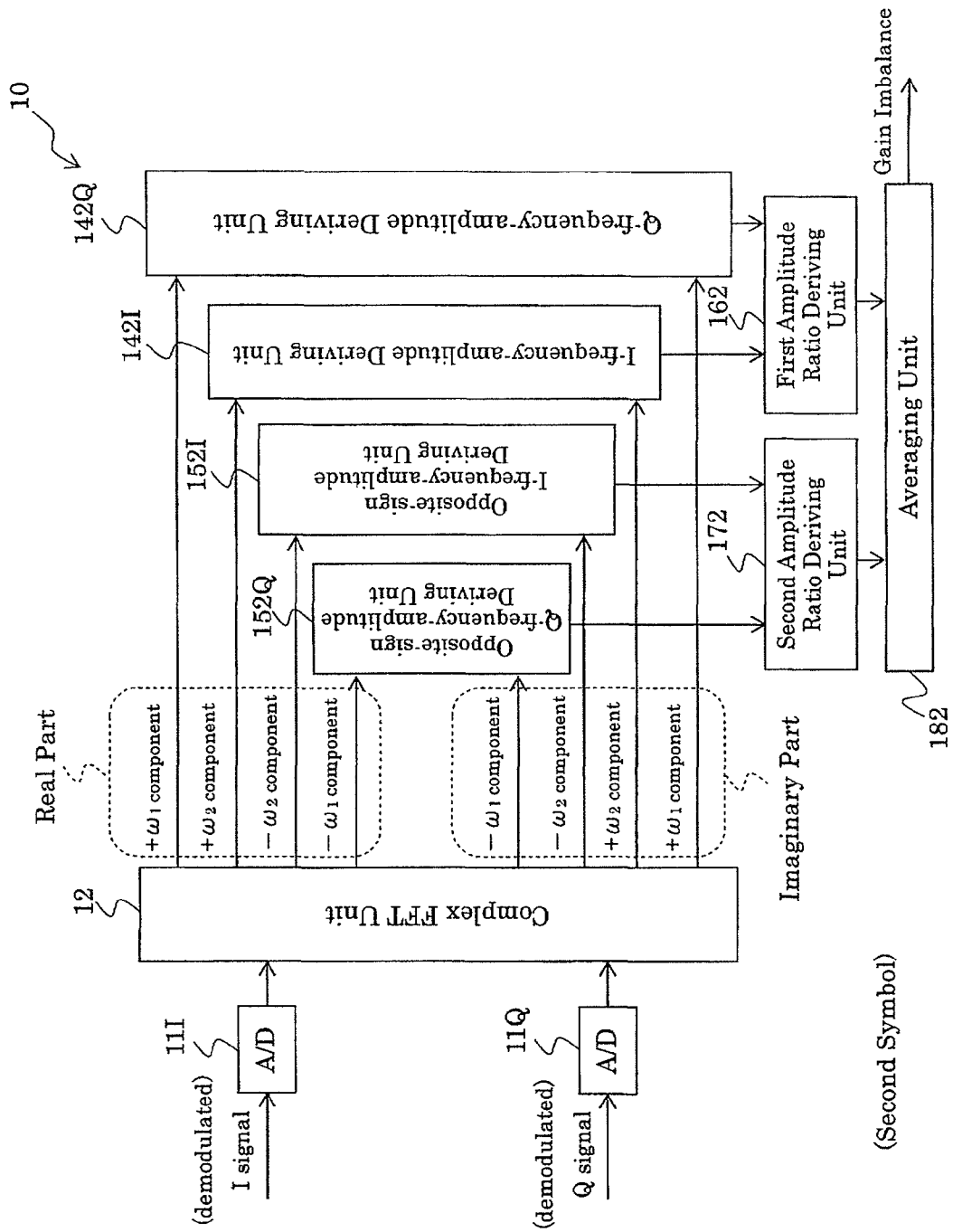
FIG. 9 is a functional block diagram showing the configuration of the modulation error measurement device (gain imbalance measurement device) 10 according to the third embodiment, and shows an operation at the second symbol.

FIG. 8 is a functional block diagram showing a configuration of the modulation error measurement device (gain imbalance measurement device) 10 according to the third embodiment, and shows an operation at the first symbol. FIG. 9 is a functional block diagram showing the configuration of the modulation error measurement device (gain imbalance measurement device) 10 according to the third embodiment, and shows an operation at the second symbol.

The modulation error measurement device 10 includes the A/D converters 11I and 11Q, the complex FFT unit 12, an I-frequency-amplitude deriving unit 142I, an opposite-sign I-frequency-amplitude deriving unit 152I, a Q-frequency-amplitude deriving unit 142Q, an opposite-sign Q-frequency-amplitude deriving unit 152Q, a first amplitude ratio deriving unit 162, a second amplitude ratio deriving unit 172, and an averaging unit 182.

The A/D converters 11I and 11Q and the complex FFT unit 12 are the same as those of the first embodiment.

The I-frequency-amplitude deriving unit 142I derives the amplitude of the I frequency component of the demodulated signal based on the real part and imaginary part of the I frequency component of the demodulated signal.

The I-frequency-amplitude deriving unit 142I derives the amplitude of the I frequency component (angular frequency: $+\omega_1$) of the demodulated signal at the first symbol (refer to FIG. 8) and derives the amplitude of the I frequency component (angular frequency: $+\omega_2$) of the demodulated signal at the second symbol (refer to FIG. 9).

At the first symbol, the square root of a sum of the square of the real part of the I frequency component of the demodulated signal (refer to the equation (23)) and the square of the imaginary part of the I frequency component of the demodulated signal (refer to the equation (24)) is set as the amplitude $((¼)a_1 g_I)$ of the I frequency component (angular frequency: $+\omega_1$) of the demodulated signal.

Also at the second symbol, similarly, the square root of the sum of the square of the real part of the I frequency component of the demodulated signal and the square of the imaginary part of the I frequency component of the demodulated signal is set as the amplitude $((¼)a_2 g_I)$ of the I frequency component (angular frequency: $+\omega_2$) of the demodulated signal.

The opposite-sign I-frequency-amplitude deriving unit 152I derives the amplitude of the opposite-sign I frequency component of the demodulated signal based on the real part and imaginary part of the opposite-sign I frequency component of the demodulated signal.

The opposite-sign I-frequency-amplitude deriving unit 152I derives the amplitude of the opposite-sign I frequency component (angular frequency: $-\omega_1$) of the demodulated signal at the first symbol (refer to FIG. 8) and derives the amplitude of the opposite-sign I frequency component (angular frequency: $-\omega_2$) of the demodulated signal at the second symbol (refer to FIG. 9).

At the first symbol, the square root of a sum of the square of the real part of the opposite-sign I frequency component of the demodulated signal (refer to the equation (28)) and the square of the imaginary part of the opposite-sign I frequency component of the demodulated signal (refer to the equation (29)) is set as the amplitude $((¼)a_1 g_I)$ of the opposite-sign I frequency component (angular frequency: $-\omega_1$) of the demodulated signal.

Also at the second symbol, similarly, the square root of the sum of the square of the real part of the opposite-sign I frequency component of the demodulated signal and the square of the imaginary part of the opposite-sign I frequency component of the demodulated signal is set as the amplitude $((¼)a_2 g_I)$ of the opposite-sign I frequency component (angular frequency: $-\omega_2$) of the demodulated signal.

The Q-frequency-amplitude deriving unit 142Q derives the amplitude of the Q frequency component of the demodulated signal based on the real part and imaginary part of the Q frequency component of the demodulated signal.

The Q-frequency-amplitude deriving unit 142Q derives the amplitude of the Q frequency component (angular frequency: $+\omega_2$) of the demodulated signal at the first symbol (refer to FIG. 8) and derives the amplitude of the Q frequency component (angular frequency: $+\omega_1$) of the demodulated signal at the second symbol (refer to FIG. 9).

At the first symbol, the square root of a sum of the square of the real part of the Q frequency component of the demodulated signal (refer to the equation (33)) and the square of the imaginary part of the Q frequency component of the demodulated signal (refer to the equation (34)) is set as the amplitude $((¼)a_2 g_Q)$ of the Q frequency component (angular frequency: $+\omega_2$) of the demodulated signal.

Also at the second symbol, similarly, the square root of the sum of the square of the real part of the Q frequency component of the demodulated signal and the square of the imaginary part of the Q frequency component of the demodulated signal is set as the amplitude $((¼)a_1 g_Q)$ of the Q frequency component (angular frequency: $+\omega_1$) of the demodulated signal.

The opposite-sign Q-frequency-amplitude deriving unit 152Q derives the amplitude of the opposite-sign Q frequency component of the demodulated signal based on the real part and imaginary part of the opposite-sign Q frequency component of the demodulated signal.

The opposite-sign Q-frequency-amplitude deriving unit 152Q derives the amplitude of the opposite-sign Q frequency component (angular frequency: $-\omega_2$) of the demodulated signal at the first symbol (refer to FIG. 8) and derives the amplitude of the opposite-sign Q frequency component (angular frequency: $-\omega_1$) of the demodulated signal at the second symbol (refer to FIG. 9).

At the first symbol, the square root of a sum of the square of the real part of the opposite-sign Q frequency component of the demodulated signal (refer to the equation (38)) and the square of the imaginary part of the opposite-sign Q frequency component of the demodulated signal (refer to the equation (39)) is set as the amplitude $((¼)a_2 g_Q)$ of the opposite-sign Q frequency component (angular frequency: $-\omega_2$) of the demodulated signal.

Also at the second symbol, similarly, the square root of the sum of the square of the real part of the opposite-sign Q frequency component of the demodulated signal and the square of the imaginary part of the opposite-sign Q frequency component of the demodulated signal is set as the amplitude $((¼)a_1 g_Q)$ of the opposite-sign Q frequency component (angular frequency: $-\omega_1$) of the demodulated signal.

The first amplitude ratio deriving unit 162 derives the ratio between the derived result of the I-frequency-amplitude deriving unit 142I and the derived result of the Q-frequency-amplitude deriving unit 142Q for the respective frequencies.

In other words, the first amplitude ratio deriving unit 162 derives the ratio $g_Q/g_I$ between the amplitude $((¼)a_1 g_I)$ of the I frequency component (angular frequency: $+\omega_1$) of the demodulated signal (derived result of the I-frequency-amplitude deriving unit 142I at the first symbol, refer to FIG. 8) and the amplitude $((¼)a_1 g_Q)$ of the Q frequency component (angular frequency: $+\omega_1$) of the demodulated signal (derived result of the Q-frequency-amplitude deriving unit 142Q at the second symbol, refer to FIG. 9).

Moreover, the first amplitude ratio deriving unit 162 derives the ratio $g_Q/g_I$ between the amplitude $((1/4)a_2g_I)$ of the I frequency component (angular frequency: $+\omega_2$) of the demodulated signal (derived result of the I-frequency-amplitude deriving unit 142I at the second symbol, refer to FIG. 9) and the amplitude $((1/4)a_2g_Q)$ of the Q frequency component (angular frequency: $+\omega_2$) of the demodulated signal (derived result of the Q-frequency-amplitude deriving unit 142Q at the first symbol, refer to FIG. 8).

The second amplitude ratio deriving unit 172 derives the ratio between the derived result of the opposite-sign I-frequency-amplitude deriving unit 152I and the derived result of the opposite-sign Q-frequency-amplitude deriving unit 152Q for the respective frequencies.

In other words, the second amplitude ratio deriving unit 172 derives the ratio $g_Q/g_I$ between the amplitude $((1/4)a_1g_I)$ of the opposite-sign I frequency component (angular frequency: $-\omega_1$) of the demodulated signal (derived result of the opposite-sign I-frequency-amplitude deriving unit 152I at the first symbol, refer to FIG. 8) and the amplitude $((1/4)a_1g_Q)$ of the opposite-sign Q frequency component (angular frequency: $-\omega_1$) of the demodulated signal (derived result of the opposite-sign Q-frequency-amplitude deriving unit 152Q at the second symbol, refer to FIG. 9).

Moreover, the second amplitude ratio deriving unit 172 derives the ratio $g_Q/g_I$ between the amplitude $((1/4)a_2g_I)$ of the opposite-sign I frequency component (angular frequency: $-\omega_2$) of the demodulated signal (derived result of the opposite-sign I-frequency-amplitude deriving unit 152I at the second symbol, refer to FIG. 9) and the amplitude $((1/4)a_2g_Q)$ of the opposite-sign Q frequency component (angular frequency: $-\omega_2$) of the demodulated signal (derived result of the opposite-sign Q-frequency-amplitude deriving unit 152Q at the first symbol, refer to FIG. 8).

The averaging unit 182 obtains an average of the derived result $g_Q/g_I$ (for the angular frequencies $\omega_1$ and $\omega_2$) of the first amplitude ratio deriving unit and the derived result $g_Q/g_I$ (for the angular frequencies $-\omega_1$ and $-\omega_2$) of the second amplitude ratio deriving unit, and derives the gain imbalance based on the obtained average. In this case, the average obtained by the averaging unit 182 is the ratio (gain imbalance) between the amplitude of the I component of the RF signal and the amplitude of the Q component of the RF signal.

A description will now be given of an operation of the third embodiment.

First Symbol (Refer to FIGS. 6 and 8):

First, the quadrature modulator 2 (refer to FIG. 2) applies the quadrature modulation to the (original) I signal and (original) Q signal (refer to the first symbol in FIG. 6), and outputs the RF signal (modulated signal). The RF signal is demodulated according to the quadrature demodulation by the quadrature demodulator 4. The demodulated signals (refer to equations (16) and (19)) are output from the quadrature demodulator 4. The demodulated signals include the (demodulated) I signal and (demodulated) Q signal.

The modulation error measurement device 10 receives the (demodulated) I signal and (demodulated) Q signal. The (demodulated) I signal is fed to the complex FFT unit 12 via the A/D converter 11I. The (demodulated) Q signal is fed to the complex FFT unit 12 via the A/D converter 11Q.

The complex FFT unit 12 applies the FFT to the demodulated signals, and outputs the real parts and imaginary parts of the I frequency component (angular frequency: $+\omega_1$), the opposite-sign I frequency component (angular frequency: $-\omega_1$), the Q frequency component (angular frequency: $+\omega_2$), and the opposite-sign Q frequency component (angular frequency: $-\omega_2$).

The I-frequency-amplitude deriving unit 142I derives the amplitude $((1/4)a_1g_I)$ of the I frequency component (angular frequency: $\omega_1$) of the demodulated signal based on the real part and imaginary part of the I frequency component of the demodulated signal.

The opposite-sign I-frequency-amplitude deriving unit 152I derives the amplitude $((1/4)a_1g_I)$ of the opposite-sign I frequency component (angular frequency: $-\omega_1$) of the demodulated signal based on the real part and imaginary part of the opposite-sign I frequency component of the demodulated signal.

The Q-frequency-amplitude deriving unit 142Q derives the amplitude $((1/4)a_2g_Q)$ of the Q frequency component (angular frequency: $+\omega_2$) of the demodulated signal based on the real part and imaginary part of the Q frequency component of the demodulated signal.

The opposite-sign Q-frequency-amplitude deriving unit 152Q derives the amplitude $((1/4)a_2g_Q)$ of the opposite-sign Q frequency component (angular frequency: $-\omega_2$) of the demodulated signal based on the real part and imaginary part of the opposite-sign Q frequency component of the demodulated signal.

Second Symbol (Refer to FIGS. 6 and 9):

Then, the quadrature modulator 2 (refer to FIG. 2) applies the quadrature modulation to the (original) I signal and (original) Q signal (refer to the second symbol in FIG. 6), and outputs the RF signal (modulated signal). The RF signal is demodulated according to the quadrature demodulation by the quadrature demodulator 4. The demodulated signals (refer to equations (16) and (46)) are output from the quadrature demodulator 4. The demodulated signals include the (demodulated) I signal and (demodulated) Q signal.

The modulation error measurement device 10 receives the (demodulated) I signal and (demodulated) Q signal. The (demodulated) I signal is fed to the complex FFT unit 12 via the A/D converter 11I. The (demodulated) Q signal is fed to the complex FFT unit 12 via the A/D converter 11Q.

The complex FFT unit 12 applies the FFT to the demodulated signal, and outputs the real parts and imaginary parts of the I frequency component (angular frequency: $+\omega_2$), the opposite-sign I frequency component (angular frequency: $-\omega_2$), the Q frequency component (angular frequency: $+\omega_1$), and the opposite-sign Q frequency component (angular frequency: $-\omega_1$).

The I-frequency-amplitude deriving unit 142I derives the amplitude $((1/4)a_2g_I)$ of the I frequency component (angular frequency: $+\omega_2$) of the demodulated signal based on the real part and imaginary part of the I frequency component of the demodulated signal.

The opposite-sign I-frequency-amplitude deriving unit 152I derives the amplitude $((1/4)a_2g_I)$ of the opposite-sign I frequency component (angular frequency: $-\omega_2$) of the demodulated signal based on the real part and imaginary part of the opposite-sign I frequency component of the demodulated signal.

The Q-frequency-amplitude deriving unit 142Q derives the amplitude $((1/4)a_1g_Q)$ of the Q frequency component (angular frequency: $+\omega_1$) of the demodulated signal based on the real part and imaginary part of the Q frequency component of the demodulated signal.

The opposite-sign Q-frequency-amplitude deriving unit 152Q derives the amplitude $((1/4)a_1g_Q)$ of the opposite-sign Q frequency component (angular frequency: $-\omega_1$) of the demodulated signal based on the real part and imaginary part of the opposite-sign Q frequency component of the demodulated signal.

After the (original) I signal and the (original) Q signal at the first symbol and second symbol are fed, the first amplitude ratio deriving unit 162 derives the ratio $g_Q/g_I$ between the derived result of the I-frequency-amplitude deriving unit 142I and the derived result of the Q-frequency-amplitude deriving unit 142Q for the respective frequencies ($\omega_1/2\pi$ and $\omega_2/2\pi$).

The second amplitude ratio deriving unit 172 derives the ratio $g_Q/g_I$ between the derived result of the opposite-sign I-frequency-amplitude deriving unit 152I and the derived result of the opposite-sign Q-frequency-amplitude deriving unit 152Q for the respective frequencies ($-\omega_1/2\pi$ and $-\omega_2/2\pi$.)

The averaging unit 182 derives the average of the derived result $g_Q/g_I$ (for the angular frequencies $\omega_1$ and $\omega_2$) of the first amplitude ratio deriving unit and the derived result $g_Q/g_I$ (for the angular frequencies $-\omega_1$ and $-\omega_2$) of the second amplitude ratio deriving unit. The derived result is the ratio (gain imbalance) between the amplitude of the I component of the RF signal and the amplitude of the Q component of the RF signal.

According to the third embodiment, it is possible, by using the (original) I signal and (original) Q signal, which are the same as those of the second embodiment (refer to FIG. 6), to measure the gain imbalance of the quadrature modulator 2.

When the gain imbalance is measured, the influence of the phase noises is small, and the gain imbalance $g_Q/g_I$ is derived for the respective frequencies.

Moreover, the above-described embodiments may be realized in the following manner. A computer is provided with a CPU, a hard disk, and a media (such as a floppy disk (registered trade mark) and a CD-ROM) reader, and the media reader is caused to read a medium recording a program realizing the above-described respective components (such as the complex FFT unit 12, the I-frequency-phase deriving unit 14I, the opposite-sign I-frequency-phase deriving unit 15I, the Q-frequency-phase deriving unit 14Q, the opposite-sign Q-frequency-phase deriving unit 15Q, the first quadrature error deriving unit 16, the second quadrature error deriving unit 17, the averaging unit 18, the I-frequency-amplitude deriving unit 142I, the opposite-sign I-frequency-amplitude deriving unit 152I, the Q-frequency-amplitude deriving unit 142Q, the opposite-sign Q-frequency-amplitude deriving unit 152Q, the first amplitude ratio deriving unit 162, the second amplitude ratio deriving unit 172, and the averaging unit 182), thereby installing the program on the hard disk. This method may also realize the above-described functions.

The invention claimed is:

1. A phase-difference-corresponding-value measurement device which receives a demodulated signal from a quadrature demodulator for receiving a modulated signal output by a quadrature modulator, and applying quadrature demodulation to the received signal, and measures a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the phase-difference-corresponding-value measurement device comprising:

an I-frequency-phase deriving unit that derives the phase of a component of the I frequency of the demodulated signal;

an opposite-sign I-frequency-phase deriving unit that derives the phase of a component of the opposite-sign I frequency of the demodulated signal;

a Q-frequency-phase deriving unit that derives the phase of a component of the Q frequency of the demodulated signal;

an opposite-sign Q-frequency-phase deriving unit that derives the phase of a component of the opposite-sign Q frequency of the demodulated signal;

a first phase-difference-corresponding-value deriving unit that derives a first phase-difference corresponding value corresponding to a difference between the derived result of the I-frequency-phase deriving unit and the derived result of the Q-frequency-phase deriving unit;

a second phase-difference-corresponding-value deriving unit that derives a second phase-difference corresponding value corresponding to a difference between the derived result of the opposite-sign I-frequency-phase deriving unit and the derived result of the opposite-sign Q-frequency-phase deriving unit; and an averaging unit that derives the phase-difference corresponding value based on an average of the first phase-difference corresponding value and the second phase-difference corresponding value.

2. The phase-difference-corresponding-value measurement device according to claim 1, wherein:

the original I signal and the original Q signal are fed to the quadrature modulator at a predetermined time point; and the original I signal having a frequency of the original Q signal at the predetermined time point, and the original Q signal having a frequency of the original I signal at the predetermined time point are fed to the quadrature modulator after the predetermined time point.

3. The phase-difference-corresponding-value measurement device according to claim 1, wherein:

the first phase-difference corresponding value is a difference between the difference between the derived result of the I-frequency-phase deriving unit and the derived result of the Q-frequency-phase deriving unit and 90 degrees; and the second phase-difference corresponding value is a difference between the difference between the derived result of the opposite-sign I-frequency-phase deriving unit and the derived result of the opposite-sign Q-frequency-phase deriving unit and 90 degrees.

4. The phase-difference-corresponding-value measurement device according to claim 1, wherein:

the quadrature modulator comprises:

a local signal source for modulation that outputs a local signal for modulation, an I signal multiplier for modulation that multiplies the local signal for modulation and the original I signal by each other, a Q signal multiplier for modulation that multiplies an orthogonal local signal for modulation orthogonal in phase to the local signal for modulation and the original Q signal by each other, and an adder that adds an output from the I signal multiplier for modulation and an output from the Q signal multiplier for modulation to each other; and the quadrature demodulator comprises:

a local signal source for demodulation that outputs a local signal for demodulation, an I signal multiplier for demodulation that multiplies the local signal for demodulation and the modulated signal by each other, and a Q signal multiplier for demodulation that multiplies an orthogonal local signal for demodulation orthogonal in phase to the local signal for demodulation and the modulated signal by each other.

5. A gain imbalance measurement device which receives a demodulated signal from a quadrature demodulator for receiving a modulated signal output by a quadrature modulator, and applying quadrature demodulation to the received signal, and measures a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the gain imbalance measurement device comprising:
an I-frequency-amplitude deriving unit that derives an amplitude of a component of the I frequency of the demodulated signal;
an opposite-sign I-frequency-amplitude deriving unit that derives an amplitude of a component of the opposite-sign I frequency of the demodulated signal;
a Q-frequency-amplitude deriving unit that derives an amplitude of a component of the Q frequency of the demodulated signal;
an opposite-sign Q-frequency-amplitude deriving unit that derives an amplitude of a component of the opposite-sign Q frequency of the demodulated signal;
a first amplitude ratio deriving unit that derives a ratio between the derived result of the I-frequency-amplitude deriving unit and the derived result of the Q-frequency-amplitude deriving unit for the respective frequencies;
a second amplitude ratio deriving unit that derives a ratio between the derived result of the opposite-sign I-frequency-amplitude deriving unit and the derived result of the opposite-sign Q-frequency-amplitude deriving unit for the respective frequencies; and
an averaging unit that derives the gain imbalance based on an average of the derived result of the first amplitude ratio deriving unit and the derived result of the second amplitude ratio deriving unit.

6. The gain imbalance measurement device according to claim 5, wherein:
the quadrature modulator comprises:
a local signal source for modulation that outputs a local signal for modulation;
an I signal multiplier for modulation that multiplies the local signal for modulation and the original I signal by each other;
a Q signal multiplier for modulation that multiplies an orthogonal local signal for modulation orthogonal in phase to the local signal for modulation and the original Q signal by each other; and
an adder that adds an output from the I signal multiplier for modulation and an output from the Q signal multiplier for modulation to each other, and
the quadrature demodulator comprises:
a local signal source for demodulation that outputs a local signal for demodulation;
an I signal multiplier for demodulation that multiplies the local signal for demodulation and the modulated signal by each other; and
a Q signal multiplier for demodulation that multiplies an orthogonal local signal for demodulation orthogonal in phase to the local signal for demodulation and the modulated signal by each other.

7. A phase-difference-corresponding-value measurement method of receiving a demodulated signal from a quadrature demodulator for receiving a modulated signal output by a quadrature modulator, and applying quadrature demodulation to the received signal, and measuring a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the phase-difference-corresponding-value measurement method comprising:
deriving the phase of a component of the I frequency of the demodulated signal;
deriving the phase of a component of the opposite-sign I frequency of the demodulated signal;
deriving the phase of a component of the Q frequency of the demodulated signal;
deriving the phase of a component of the opposite-sign Q frequency of the demodulated signal;
deriving a first phase-difference corresponding value corresponding to a difference between the derived result of the deriving of the I-frequency-phase and the derived result of the deriving of the Q-frequency-phase;
deriving a second phase-difference corresponding value corresponding to a difference between the derived result of the deriving of the opposite-sign I-frequency-phase and the derived result of the deriving of the opposite-sign Q-frequency-phase; and
deriving the average of the phase-difference corresponding value based on an average of the first phase-difference corresponding value and the second phase-difference corresponding value.

8. A gain imbalance measurement method of receiving a demodulated signal from a quadrature demodulator for receiving a modulated signal output by a quadrature modulator, and applying quadrature demodulation to the received signal, and measuring a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the gain imbalance measurement method comprising:

deriving an amplitude of a component of the I frequency of the demodulated signal;

deriving an amplitude of a component of the opposite-sign I frequency of the demodulated signal;

deriving an amplitude of a component of the Q frequency of the demodulated signal;

deriving an amplitude of a component of the opposite-sign Q frequency of the demodulated signal;

deriving a first amplitude ratio between the derived result of the deriving of the I-frequency-amplitude and the derived result of the deriving of the Q-frequency-amplitude for the respective frequencies;

deriving a second amplitude ratio between the derived result of the deriving of the opposite-sign I-frequency-amplitude and the derived result of the deriving of the opposite-sign Q-frequency-amplitude for the respective frequencies; and deriving the average of the gain imbalance based on an average of the derived result of the deriving of the first amplitude ratio and the derived result of the deriving of the second amplitude ratio.

9. A computer-readable medium having a program of instructions for execution by a computer to perform a phase-difference-corresponding-value measurement process of receiving a demodulated signal from a quadrature demodulator for receiving a modulated signal output by a quadrature modulator, and applying quadrature demodulation to the received signal, and measuring a phase-difference corresponding value corresponding to a phase difference between an I component and a Q component of the modulated signal, wherein the quadrature modulator applies the quadrature modulation to an original I signal and an original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the phase-difference-corresponding-value measurement process comprising:

deriving the phase of a component of the I frequency of the demodulated signal;

deriving the phase of a component of the opposite-sign I frequency of the demodulated signal;

deriving the phase of a component of the Q frequency of the demodulated signal;

deriving the phase of a component of the opposite-sign Q frequency of the demodulated signal;

deriving a first phase-difference corresponding value corresponding to a difference between the derived result of the deriving of the I-frequency-phase and the derived result of the deriving of the Q-frequency-phase;

deriving a second phase-difference corresponding value corresponding to a difference between the derived result of the deriving of the opposite-sign I-frequency-phase and the derived result of the deriving of the opposite-sign Q-frequency-phase; and deriving the average of the phase-difference corresponding value based on an average of the first phase-difference corresponding value and the second phase-difference corresponding value.

10. A computer-readable medium having a program of instructions for execution by a computer to perform a gain imbalance measurement process of receiving a demodulated signal from a quadrature demodulator for receiving a modulated signal output by a quadrature modulator, and applying quadrature demodulation to the received signal, and measuring a gain imbalance which is a ratio between the amplitude of a I component of the modulated signal and the amplitude of an Q component, wherein an original I signal and an original Q signal are fed to the quadrature modulator at a predetermined time point, the original I signal having a frequency of the original Q signal at the predetermined time point, and the original Q signal having a frequency of the original I signal at the predetermined time point are fed to the quadrature modulator after the predetermined time point, the quadrature modulator applies the quadrature modulation to the original I signal and the original Q signal having frequencies different from each other, the frequency of the original I signal is referred to as I frequency, a frequency obtained by inverting the sign of the frequency of the original I signal is referred to as opposite-sign I frequency, the frequency of the original Q signal is referred to as Q frequency, a frequency obtained by inverting the sign of the frequency of the original Q signal is referred to as opposite-sign Q frequency, the gain imbalance measurement process comprising:

deriving an amplitude of a component of the I frequency of the demodulated signal;

deriving an amplitude of a component of the opposite-sign I frequency of the demodulated signal;

deriving an amplitude of a component of the Q frequency of the demodulated signal;

deriving an amplitude of a component of the opposite-sign Q frequency of the demodulated signal;

deriving a first amplitude ratio between the derived result of the deriving of the I-frequency-amplitude and the derived result of the deriving of the Q-frequency-amplitude for the respective frequencies;

deriving a second amplitude ratio between the derived result of the deriving of the opposite-sign I-frequency-amplitude and the derived result of the deriving of the opposite-sign Q-frequency-amplitude for the respective frequencies; and deriving the average of the gain imbalance based on an average of the derived result of the deriving of the first amplitude ratio and the derived result of the deriving of the second amplitude ratio.

\* \* \* \* \*